US008488161B2

(12) United States Patent
Sunata

(10) Patent No.: US 8,488,161 B2
(45) Date of Patent: Jul. 16, 2013

(54) MANAGEMENT APPARATUS AND METHOD FOR SETTING A SCHEDULE FOR TRANSMITTING DEPARTMENT COUNTER INFORMATION FROM IMAGE FORMING APPARATUSES

(75) Inventor: Jin Sunata, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 799 days.

(21) Appl. No.: 12/720,558

(22) Filed: Mar. 9, 2010

(65) Prior Publication Data

US 2010/0231965 A1 Sep. 16, 2010

(30) Foreign Application Priority Data

Mar. 16, 2009 (JP) .................................. 2009-063141

(51) Int. Cl.
*G06F 3/12* (2006.01)
(52) U.S. Cl.
USPC .................... 358/1.15; 399/8; 399/9; 399/10; 399/79; 710/15; 710/18
(58) Field of Classification Search
USPC ................ 358/1.15; 399/8, 9, 10, 79; 710/15, 710/18
See application file for complete search history.

(56) References Cited

U.S. PATENT DOCUMENTS

| 6,597,469 B1* | 7/2003 | Kuroyanagi | 358/1.15 |
| 2003/0112456 A1* | 6/2003 | Tomita et al. | 358/1.13 |
| 2007/0288705 A1* | 12/2007 | Sunata | 711/154 |
| 2008/0106766 A1* | 5/2008 | Nakamoto | 358/406 |
| 2009/0147301 A1* | 6/2009 | Lee | 358/1.15 |

FOREIGN PATENT DOCUMENTS

JP 2004-310468 A 11/2004

* cited by examiner

*Primary Examiner* — Peter K Huntsinger
(74) *Attorney, Agent, or Firm* — Canon USA, Inc., IP Division

(57) ABSTRACT

A management apparatus capable of setting a suitable schedule for transmitting operation information to a plurality of image forming apparatuses, in which a management load and an operation status of a user are fully considered, identifies a plurality of image forming apparatuses which include overlapping department ID and manages the plurality of identified image forming apparatuses in a group when the plurality of identified image forming apparatuses is less than a predetermined maximum value. The management apparatus determines a transmission schedule for each of a plurality of the managed groups so that department counter information is transmitted from the image forming apparatuses belonging to each group at intervals of at least a first time period.

7 Claims, 19 Drawing Sheets

FIG.8A
SETTING TABLE FOR EACH UNIT NO.

| IMAGE FORMING APPARATUS INFORMATION | UNIT NO. | | | |
|---|---|---|---|---|
| DEPARTMENT ID | DEPARTMENT COUNTER TRANSMISSION SCHEDULING SETTING VALUE | | | |
| | COUNTER VALUE (ON A DAILY BASIS) | DETERMINATION TARGET FLAG | INCREASE IN COUNTER | GROUP |
| DEPARTMENT NO. | | | | |
| ⋮ | ⋮ | ⋮ | ⋮ | ⋮ |
| DEPARTMENT NO. | | | | |

FIG.8B
SCHEDULING UPDATE PARAMETER

| PARAMETER | SETTING VALUE | REMARKS |
|---|---|---|
| RE-SCHEDULING FLAG | 1 | 1: PERFORMED, 0: AUTOMATIC RE-SCHEDULING NOT PERFORMED |
| INTERVAL (HOURS) | 720 (30 DAYS) | INTERVAL DURING WHICH THERE IS NO INCREASE IN COUNTER |
| MAXIMUM VALUE (SHEETS) | 10,000 | |
| THRESHOLD VALUE OF INCREASE IN COUNTER WITH RESPECT TO MAXIMUM VALUE (%) | 0.5% | WITH AN IDENTICAL IMAGE FORMING APPARATUS, IF AN INCREASE IN COUNTER OF A CERTAIN DEPARTMENT WITH RESPECT TO A TOTAL INCREASE IN COUNTER IS LESS THAN THIS THRESHOLD VALUE, THE IMAGE FORMING APPARATUS IS DETERMINED TO BE UNUSED. |

FIG.8C
MAXIMUM NUMBER FOR GROUPING

| PARAMETER | SETTING VALUE | REMARKS |
|---|---|---|
| MAXIMUM NUMBER OF IMAGE FORMING APPARATUSES PER GROUP | 200 | MAXIMUM NUMBER OF IMAGE FORMING APPARATUSES THAT CAN BE REGISTERED AS ONE GROUP |

FIG.12

DEPARTMENT SUMMARY SCREEN — 1201

Department Totals  Totals of All Departments (Specific Period Total)

Period: 10-01-2004 to 10-03-2004  — 1205

Monthly/ Specific Period Total    Change Period: 10-01-2004 ▣ to 10-03-2004 ▣

| Export | Department ID ▲ | Total | — 1203 |
|---|---|---|---|
| Total | 1202 | Total Prints 166<br>Total Color Prints —<br>Total B&W Prints 20279<br>Color Copy 2989<br>Color Scan —<br>Color Print 187<br>B&W Copy —<br>B&W Scan —<br>B&W Print — | 1206 |
| Details | Department 1 | Total Prints 6<br>Total Color Prints 15<br>Total Black Prints 24<br>Color Copy 33<br>Color Scan 42<br>Color Print 51<br>Black Copy 60<br>Black Scan 69<br>Black Print 78 | 1207 |
| Details | Department 2 | Total Prints 150<br>Total Color Prints 240<br>Total Black Prints 600<br>Color Copy 690<br>Color Scan 780<br>Color Print 60<br>Black Copy 870<br>Black Scan 330<br>Black Print 420 | |
| Details | Department 3 | Total Prints 10<br>Total Color Prints 34<br>Total Black Prints 19655<br>Color Copy 2266<br>Color Scan 1368<br>Color Print 76<br>Black Copy 205<br>Black Scan 95 | |

◀ Back        < Previous        Next >

| DEPARTMENT | Dev1 | | | Dev2 | | | Dev3 | | | Dev4 | | | ... | Dev8 | | | Dev9 | | | Dev10 | | |
|---|---|---|---|---|---|---|---|---|---|---|---|---|---|---|---|---|---|---|---|---|---|---|
| | COUNTER | VARIATION | GROUP | COUNTER | VARIATION | GROUP | COUNTER | VARIATION | GROUP | COUNTER | VARIATION | GROUP | | COUNTER | VARIATION | GROUP | COUNTER | VARIATION | GROUP | COUNTER | VARIATION | GROUP |
| 1 | 0 | 0 | G01 | | | | | | | | | | | | | | | | | | | |
| 2 | 0 | 0 | G01 | | | | | | | | | | | | | | | | | | | |
| 3 | 0 | 0 | G01 | | | | | | | | | | | | | | | | | | | |
| 4 | 0 | 0 | G01 | | | | | | | | | | | | | | | | | | | |
| 5 | 0 | 0 | G01 | | | | | | | | | | | | | | | | | | | |
| 6 | 0 | 0 | G01 | | | | | | | | | | | | | | | | | | | |
| ... | | | | | | | | | | | | | | | | | | | | | | |
| 50 | | | | 900 | 0 | G01 | | | | | | | | | | | | | | | | |
| 51 | | | | 100 | 0 | G01 | | | | | | | | | | | | | | | | |
| 52 | | | | 100 | 0 | G01 | | | | | | | | | | | | | | | | |
| 53 | | | | 100 | 0 | G01 | | | | | | | | | | | | | | | | |
| ... | | | | | | | | | | | | | | | | | | | | | | |
| 97 | | | | | | | 130 | 0 | G01 | 500 | 0 | G01 | | | | | | | | | | |
| 98 | | | | | | | 200 | 0 | G01 | 700 | 0 | G01 | | | | | | | | | | |
| 99 | | | | | | | 100 | 0 | G01 | 900 | 0 | G01 | | | | | | | | | | |
| 100 | | | | | | | 700 | 0 | G01 | 20 | 0 | G01 | | | | | | | | | | |
| ... | | | | | | | | | | | | | | | | | | | | | | |
| 200 | | | | | | | 15 | 0 | G01 | 0 | 0 | G01 | | 1,000 | 0 | G01 | 200 | 0 | G01 | | | |
| 201 | | | | | | | 30 | 0 | G01 | 0 | 0 | G01 | | 1,600 | 0 | G01 | 400 | 0 | G01 | | | |
| 202 | | | | | | | 40 | 0 | G01 | 0 | 0 | G01 | | 2,800 | 0 | G01 | 30 | 0 | G01 | | | |
| | | | | | | | | | | 20 | 0 | G01 | | 1,800 | 0 | G01 | 500 | 0 | G01 | | | |
| | | | | | | | | | | | | | | | | | 1,000 | 0 | G01 | 300 | 0 | G01 |
| | | | | | | | | | | | | | | | | | 1,900 | 0 | G01 | 30 | 0 | G01 |
| | | | | | | | | | | | | | | | | | 400 | 0 | G01 | 80 | 0 | G01 |

| DEPARTMENT | Dev1 | | | Dev2 | | | Dev3 | | | Dev4 | | | ... | Dev8 | | | Dev9 | | | Dev10 | | |
|---|---|---|---|---|---|---|---|---|---|---|---|---|---|---|---|---|---|---|---|---|---|---|
| | COUNTER | VARIATION | GROUP | COUNTER | VARIATION | GROUP | COUNTER | VARIATION | GROUP | COUNTER | VARIATION | GROUP | | COUNTER | VARIATION | GROUP | COUNTER | VARIATION | GROUP | COUNTER | VARIATION | GROUP |
| 1 | 0 | 0 | G01 | | | | | | | | | | | | | | | | | | | |
| 2 | 0 | 0 | G01 | | | | | | | | | | | | | | | | | | | |
| 3 | 0 | 0 | G01 | | | | | | | | | | | | | | | | | | | |
| 4 | 0 | 0 | G01 | | | | | | | | | | | | | | | | | | | |
| 5 | 0 | 0 | G01 | | | | | | | | | | | | | | | | | | | |
| 6 | 0 | 0 | G01 | | | | | | | | | | | | | | | | | | | |
| ... | | | | | | | | | | | | | | | | | | | | | | |
| 50 | | | | 900 | 0 | G01 | | | | | | | | | | | | | | | | |
| 51 | | | | 100 | 0 | G01 | | | | 500 | 0 | | | | | | | | | | | |
| 52 | | | | 100 | 0 | G01 | | | | 700 | 0 | | | | | | | | | | | |
| 53 | | | | 100 | 0 | G01 | | | | 900 | 0 | | | | | | | | | | | |
| ... | | | | | | | | | | 20 | 0 | | | | | | | | | | | |
| 97 | | | | | | | 130 | 0 | G02 | 0 | 0 | G01 | | 1,000 | 0 | G03 | 200 | 0 | G03 | | | |
| 98 | | | | | | | 200 | 0 | G02 | 0 | 0 | G01 | | 1,600 | 0 | G03 | 400 | 0 | G03 | | | |
| 99 | | | | | | | 100 | 0 | G02 | 0 | 0 | G01 | | 2,800 | 0 | G03 | 30 | 0 | G03 | | | |
| 100 | | | | | | | 700 | 0 | G02 | 20 | 0 | G01 | | 1,800 | 0 | G03 | 500 | 0 | G03 | | | |
| ... | | | | | | | | | | | | | | | | | | | | | | |
| 200 | | | | | | | 15 | 0 | G02 | | | | | | | | 1,000 | 0 | G03 | 300 | 0 | G04 |
| 201 | | | | | | | 30 | 0 | G02 | | | | | | | | 1,900 | 0 | G03 | 30 | 0 | G04 |
| 202 | | | | | | | 40 | 0 | G02 | | | | | | | | 400 | 0 | G03 | 80 | 0 | G04 |

| DEPARTMENT | Dev1 COUNTER | Dev1 VARIATION | Dev1 GROUP | Dev2 COUNTER | Dev2 VARIATION | Dev2 GROUP | Dev3 COUNTER | Dev3 VARIATION | Dev3 GROUP | Dev4 COUNTER | Dev4 VARIATION | Dev4 GROUP | ... | Dev8 COUNTER | Dev8 VARIATION | Dev8 GROUP | Dev9 COUNTER | Dev9 VARIATION | Dev9 GROUP | Dev10 COUNTER | Dev10 VARIATION | Dev10 GROUP |
|---|---|---|---|---|---|---|---|---|---|---|---|---|---|---|---|---|---|---|---|---|---|---|
| 1 | 100 | 1 | G01 | | | | | | | | | | | | | | | | | | | |
| 2 | 150 | 1 | G01 | | | | | | | | | | | | | | | | | | | |
| 3 | 500 | 1 | G01 | | | | | | | | | | | | | | | | | | | |
| 4 | 200 | 1 | G01 | | | | | | | | | | | | | | | | | | | |
| 5 | 50 | 1 | G01 | | | | | | | | | | | | | | | | | | | |
| 6 | 30 | 1 | G01 | | | | | | | | | | | | | | | | | | | |
| ... | | | | | | | | | | | | | | | | | | | | | | |
| 50 | | | | 1,200 | 1 | G02 | | | | 600 | 1 | G02 | | | | | | | | | | |
| 51 | | | | 400 | 1 | G02 | | | | 800 | 1 | G02 | | | | | | | | | | |
| 52 | | | | 500 | 1 | G02 | | | | 1,000 | 1 | G02 | | | | | | | | | | |
| 53 | | | | 250 | 1 | G02 | | | | 30 | 1 | G02 | | | | | | | | | | |
| ... | | | | | | | | | | | | | | | | | | | | | | |
| 97 | | | | | | | 2,000 | 1 | G02 | 15 | 1 | G02 | | 1,200 | 1 | G02 | 300 | 1 | G02 | | | |
| 98 | | | | | | | 1,500 | 1 | G02 | 20 | 1 | G02 | | 1,800 | 1 | G02 | 500 | 1 | G02 | | | |
| 99 | | | | | | | 250 | 1 | G02 | 12 | 1 | G02 | | 3,000 | 1 | G02 | 50 | 1 | G02 | | | |
| 100 | | | | | | | 850 | 1 | G02 | 25 | 1 | G02 | | 2,000 | 1 | G02 | 600 | 1 | G02 | | | |
| ... | | | | | | | | | | | | | | | | | | | | | | |
| 200 | | | | | | | 24 | 1 | G02 | | | | | | | | 1,100 | 1 | G02 | 500 | 0 | G02 |
| 201 | | | | | | | 35 | 1 | G02 | | | | | | | | 2,000 | 1 | G02 | 100 | 0 | G02 |
| 202 | | | | | | | 45 | 1 | G02 | | | | | | | | 500 | 1 | G02 | 200 | 0 | G02 |

| DEPARTMENT | Dev1 COUNTER | Dev1 VARIATION | Dev1 GROUP | Dev2 COUNTER | Dev2 VARIATION | Dev2 GROUP | Dev3 COUNTER | Dev3 VARIATION | Dev3 GROUP | Dev4 COUNTER | Dev4 VARIATION | Dev4 GROUP | ... | Dev8 COUNTER | Dev8 VARIATION | Dev8 GROUP | Dev9 COUNTER | Dev9 VARIATION | Dev9 GROUP | Dev10 COUNTER | Dev10 VARIATION | Dev10 GROUP |
|---|---|---|---|---|---|---|---|---|---|---|---|---|---|---|---|---|---|---|---|---|---|---|
| 1 | 300 | 1 | G01 | | | | | | | | | | | | | | | | | | | |
| 2 | 200 | 1 | G01 | | | | | | | | | | | | | | | | | | | |
| 3 | 800 | 1 | G01 | | | | | | | | | | | | | | | | | | | |
| 4 | 1,000 | 1 | G01 | | | | | | | | | | | | | | | | | | | |
| 5 | 300 | 1 | G01 | | | | | | | | | | | | | | | | | | | |
| 6 | 60 | 1 | G01 | | | | | | | | | | | | | | | | | | | |
| ... | | | | | | | | | | | | | | | | | | | | | | |
| 50 | | | | 2,500 | 1 | G02 | | | | 1,200 | 1 | G02 | | | | | | | | | | |
| 51 | | | | 1,200 | 1 | G02 | | | | 1,100 | 1 | G02 | | | | | | | | | | |
| 52 | | | | 1,000 | 1 | G02 | | | | 1,150 | 1 | G02 | | | | | | | | | | |
| 53 | | | | 800 | 1 | G02 | | | | 300 | 1 | G02 | | | | | | | | | | |
| ... | | | | | | | | | | | | | | | | | | | | | | |
| 97 | | | | | | | 2,500 | 1 | G03 | 15 | 0 | G02 | | 1,600 | 1 | G03 | 400 | 1 | G03 | | | |
| 98 | | | | | | | 3,000 | 1 | G03 | 20 | 0 | G02 | | 1,900 | 1 | G03 | 800 | 1 | G03 | | | |
| 99 | | | | | | | 600 | 1 | G03 | 12 | 0 | G02 | | 3,500 | 1 | G03 | 350 | 1 | G03 | | | |
| 100 | | | | | | | 900 | 1 | G03 | 25 | 0 | G02 | | 2,500 | 1 | G03 | 900 | 1 | G03 | | | |
| ... | | | | | | | | | | | | | | | | | | | | | | |
| 200 | | | | | | | 24 | 0 | G03 | | | | | | | | 1,500 | 1 | G03 | 900 | 1 | G03 |
| 201 | | | | | | | 35 | 0 | G03 | | | | | | | | 2,300 | 1 | G03 | 300 | 1 | G03 |
| 202 | | | | | | | 45 | 0 | G03 | | | | | | | | 1,100 | 1 | G03 | 450 | 1 | G03 |
| ... | | | | | | | | | | | | | | | | | | | | | | |
| 600 | | | | | | | | | | | | | | | | | | | | 450 | 1 | G03 |

| DEPARTMENT | Dev1 COUNTER | Dev1 VARIATION | Dev1 GROUP | Dev2 COUNTER | Dev2 VARIATION | Dev2 GROUP | Dev3 COUNTER | Dev3 VARIATION | Dev3 GROUP | Dev4 COUNTER | Dev4 VARIATION | Dev4 GROUP | ... | Dev8 COUNTER | Dev8 VARIATION | Dev8 GROUP | Dev9 COUNTER | Dev9 VARIATION | Dev9 GROUP | Dev10 COUNTER | Dev10 VARIATION | Dev10 GROUP |
|---|---|---|---|---|---|---|---|---|---|---|---|---|---|---|---|---|---|---|---|---|---|---|
| 1 | 100 | 1 | G01 | | | | | | | | | | | | | | | | | | | |
| 2 | 150 | 1 | G01 | | | | | | | | | | | | | | | | | | | |
| 3 | 500 | 1 | G01 | | | | | | | | | | | | | | | | | | | |
| 4 | 200 | 1 | G01 | | | | | | | | | | | | | | | | | | | |
| 5 | 50 | 1 | G01 | | | | | | | | | | | | | | | | | | | |
| 6 | 30 | 1 | G01 | | | | | | | | | | | | | | | | | | | |
| ... | | | | | | | | | | | | | | | | | | | | | | |
| 50 | | | | 1,200 | 1 | G02 | 2,000 | 1 | G02 | 600 | 1 | G02 | | | | | | | | | | |
| 51 | | | | 400 | 1 | G02 | 1,500 | 1 | G02 | 800 | 1 | G02 | | | | | | | | | | |
| 52 | | | | 500 | 1 | G02 | 250 | 1 | G02 | 1,000 | 1 | G02 | | | | | | | | | | |
| 53 | | | | 250 | 1 | G02 | 850 | 1 | G02 | 30 | 1 | G02 | | | | | | | | | | |
| ... | | | | | | | | | | | | | | | | | | | | | | |
| 97 | | | | | | | 24 | 1 | G02 | | | | | 1,200 | 1 | G02 | 300 | 1 | G02 | | | |
| 98 | | | | | | | 35 | 1 | G02 | | | | | 1,800 | 1 | G02 | 500 | 1 | G02 | | | |
| 99 | | | | | | | 45 | 1 | G02 | | | | | 3,000 | 1 | G02 | 50 | 1 | G02 | | | |
| 100 | | | | | | | | | | | | | | 2,000 | 1 | G02 | 600 | 1 | G02 | | | |
| ... | | | | | | | | | | | | | | | | | | | | | | |
| 200 | | | | | | | | | | | | | | | | | 1,100 | 1 | G02 | 500 | 1 | G02 |
| 201 | | | | | | | | | | | | | | | | | 2,000 | 1 | G02 | 100 | 1 | G02 |
| 202 | | | | | | | | | | | | | | | | | 500 | 1 | G02 | 200 | 1 | G02 |

| DEPARTMENT | Dev1 COUNTER | Dev1 VARIATION | Dev1 GROUP | Dev2 COUNTER | Dev2 VARIATION | Dev2 GROUP | Dev3 COUNTER | Dev3 VARIATION | Dev3 GROUP | Dev4 COUNTER | Dev4 VARIATION | Dev4 GROUP | ... | Dev8 COUNTER | Dev8 VARIATION | Dev8 GROUP | Dev9 COUNTER | Dev9 VARIATION | Dev9 GROUP | Dev10 COUNTER | Dev10 VARIATION | Dev10 GROUP |
|---|---|---|---|---|---|---|---|---|---|---|---|---|---|---|---|---|---|---|---|---|---|---|
| 1 | 100 | 1 | G01 | | | | | | | | | | | | | | | | | | | |
| 2 | 150 | 1 | G01 | | | | | | | | | | | | | | | | | | | |
| 3 | 500 | 1 | G01 | | | | | | | | | | | | | | | | | | | |
| 4 | 200 | 1 | G01 | | | | | | | | | | | | | | | | | | | |
| 5 | 50 | 1 | G01 | | | | | | | | | | | | | | | | | | | |
| 6 | 30 | 1 | G01 | | | | | | | | | | | | | | | | | | | |
| ... | | | | | | | | | | | | | | | | | | | | | | |
| 50 | | | | 1,200 | 1 | G02 | | | | 600 | 1 | G02 | | | | | | | | | | |
| 51 | | | | 400 | 1 | G02 | | | | 800 | 1 | G02 | | | | | | | | | | |
| 52 | | | | 500 | 1 | G02 | | | | 1,000 | 1 | G02 | | | | | | | | | | |
| 53 | | | | 250 | 1 | G02 | | | | 30 | 1 | G02 | | | | | | | | | | |
| ... | | | | | | | | | | | | | | | | | | | | | | |
| 97 | | | | | | | 2,000 | 1 | G03 | | | | | 1,200 | 1 | G03 | 300 | 1 | G03 | | | |
| 98 | | | | | | | 1,500 | 1 | G03 | | | | | 1,800 | 1 | G03 | 500 | 1 | G03 | | | |
| 99 | | | | | | | 250 | 1 | G03 | | | | | 3,000 | 1 | G03 | 50 | 1 | G03 | | | |
| 100 | | | | | | | 850 | 1 | G03 | | | | | 2,000 | 1 | G03 | 600 | 1 | G03 | | | |
| ... | | | | | | | | | | | | | | | | | | | | | | |
| 200 | | | | | | | 24 | 1 | G03 | | | | | | | | 1,100 | 1 | G03 | 500 | 1 | G03 |
| 201 | | | | | | | 35 | 1 | G03 | | | | | | | | 2,000 | 1 | G03 | 100 | 1 | G03 |
| 202 | | | | | | | 45 | 1 | G03 | | | | | | | | 500 | 1 | G03 | 200 | 1 | G03 |

| DEPARTMENT | Dev1 COUNTER | Dev1 VARIATION | Dev1 GROUP | Dev2 COUNTER | Dev2 VARIATION | Dev2 GROUP | Dev3 COUNTER | Dev3 VARIATION | Dev3 GROUP | Dev4 COUNTER | Dev4 VARIATION | Dev4 GROUP | ... | Dev8 COUNTER | Dev8 VARIATION | Dev8 GROUP | Dev9 COUNTER | Dev9 VARIATION | Dev9 GROUP | Dev10 COUNTER | Dev10 VARIATION | Dev10 GROUP | Dev11 COUNTER | Dev11 VARIATION | Dev11 GROUP |
|---|---|---|---|---|---|---|---|---|---|---|---|---|---|---|---|---|---|---|---|---|---|---|---|---|---|
| 1 | 300 | 1 | G01 | | | | | | | | | | | | | | | | | | | | | | |
| 2 | 200 | 1 | G01 | | | | | | | | | | | | | | | | | | | | | | |
| 3 | 800 | 1 | G01 | | | | | | | | | | | | | | | | | | | | | | |
| 4 | 1,000 | 1 | G01 | | | | | | | | | | | | | | | | | | | | | | |
| 5 | 300 | 1 | G01 | | | | | | | | | | | | | | | | | | | | | | |
| 6 | 60 | 1 | G01 | | | | | | | | | | | | | | | | | | | | | | |
| ... | | | | | | | | | | | | | | | | | | | | | | | | | |
| 50 | | | | 2,500 | 1 | G02 | | | | | | | | | | | | | | | | | | | |
| 51 | | | | 1,200 | 1 | G02 | | | | | | | | | | | | | | | | | | | |
| 52 | | | | 1,000 | 1 | G02 | | | | | | | | | | | | | | | | | | | |
| 53 | | | | 800 | 1 | G02 | | | | | | | | | | | | | | | | | | | |
| ... | | | | | | | | | | | | | | | | | | | | | | | | | |
| 97 | | | | | | | 2,500 | 1 | G02 | 1,200 | 1 | G02 | | | | | | | | | | | | | |
| 98 | | | | | | | 3,000 | 1 | G02 | 1,100 | 1 | G02 | | | | | | | | | | | | | |
| 99 | | | | | | | 600 | 1 | G02 | 1,150 | 1 | G02 | | | | | | | | | | | | | |
| 100 | | | | | | | 900 | 1 | G02 | 300 | 1 | G02 | | | | | | | | | | | | | |
| ... | | | | | | | | | | | | | | | | | | | | | | | | | |
| 200 | | | | | | | 24 | | | 15 | 1 | G02 | | 1,600 | | | 400 | 1 | G02 | 900 | 1 | G02 | 15 | 1 | G02 |
| 201 | | | | | | | 35 | | | 20 | 1 | G02 | | 1,900 | | | 800 | 1 | G02 | 300 | 1 | G02 | 30 | 1 | G02 |
| 202 | | | | | | | 45 | | | 12 | 1 | G02 | | 3,500 | | | 350 | 1 | G02 | 450 | 1 | G02 | 40 | 1 | G02 |
| ... | | | | | | | | | | 25 | | | | 2,500 | | | 900 | 1 | G02 | | | | | | |
| 600 | | | | | | | | | | | | | | | | | 1,500 | | | 1,100 | 1 | G02 | 450 | 1 | G02 | 200 | 1 | G02 |

1800

1801

MANAGEMENT APPARATUS AND METHOD FOR SETTING A SCHEDULE FOR TRANSMITTING DEPARTMENT COUNTER INFORMATION FROM IMAGE FORMING APPARATUSES

BACKGROUND OF THE INVENTION

1. Field of the Invention

The present invention relates to a management apparatus which manages a plurality of image forming apparatuses connected to a network.

2. Description of the Related Art

Japanese Patent Application Laid-Open No. 2004-310468 discusses a print log management server which manages monitoring servers and printers arranged on a network. More specifically, in Japanese Patent Application Laid-Open No. 2004-310468, when the configuration of the monitoring server is changed, the print log management server displays a monitoring list screen of monitoring servers "a" and "b" for monitoring a plurality of printers "a" to "n" belonging to groups "A" and "B". The screen displays information based on a print log of printers to be monitored by the monitoring servers "a" and "b". Based on the display, settings for the printers to be monitored by the monitoring servers "a" and "b" are performed.

In an actual operation, however, when performing department management based on operation information of a plurality of image forming apparatuses including a department management function, an identical department ID may be registered in the plurality of image forming apparatuses to allow a user to use the plurality of image forming apparatuses. The image forming apparatuses include printers, copying machines, and multifunction peripherals. The operation information includes counter information such as the number of printed sheets and the number of printed sides which are counted up each time printing is performed.

Therefore, a management apparatus for remotely tallying up department counter information for each department ID is capable of tally processing such as calculating a total of department counter information of each department by using the department counter information collected from the plurality of image forming apparatuses. An amount of data of the department counter information increases as a number of departments registered in the image forming apparatuses increases. A transmission schedule for transmitting the department counter from each image forming apparatus is set to once or twice a day to avoid concentration of network load and prevent the department counter information from being frequently transmitted.

However, if a department counter transmission schedule is set in a distributed way to some extent, a processing problem arises in the management apparatus pertaining to tallying and displaying the department counter information. For example, it is assumed that the management apparatus manages 10 image forming apparatuses having the transmission schedule in the morning (5:00 a.m.) and 15 image forming apparatuses having the transmission schedule in the night (11:00 p.m.).

When a tally of the department counter information is checked on the management apparatus in the daytime (1:30 p.m.) of a certain day, the screen displays a tallied result of the department counter information about the 10 image forming apparatuses collected in the morning of the day and the department counter information about the 15 image forming apparatuses collected in the night of the previous day. When a specific day is set as a deadline date for billing processing based on the department counter information, the department counter information of each image forming apparatus at the same time as the deadline date will not be reflected in the tallied result according to the set schedule.

As possible measures for coping with this problem, an identical schedule may be set to all image forming apparatuses. However, if the identical schedule is simply set to all apparatuses, in the case of a user who uses a lot of image forming apparatuses, such as a major corporation, a significantly large number of apparatuses (e.g., one hundred apparatuses or more) will be scheduled for transmission at the same time.

Since use conditions of the image forming apparatus may be changed according to a user operation, it is necessary to suitably review the schedule to attain optimum scheduling in the operation.

SUMMARY OF THE INVENTION

The present invention relates to a mechanism which can set a suitable operation information transmission schedule to an image forming apparatus in sufficient consideration of a management load and a user operation state.

According to an aspect of the present invention, a management apparatus, which manages department counter information received from a plurality of image forming apparatuses based on a transmission schedule set to each image forming apparatus using a database, includes a registration unit configured to associate (1) identification information of one of the plurality of image forming apparatuses, (2) a department ID received from the one of the plurality of image forming apparatuses, and (3) the department counter information corresponding to the department ID with each other, wherein the registration unit registers (1)-(3) as information in the database. The management apparatus further includes: an identification unit configured to identify a plurality of image forming apparatuses which include overlapping department ID; a management unit configured to manage, when the plurality of image forming apparatuses identified by the identification unit is less than a predetermined maximum value, the plurality of image forming apparatuses identified by the identification unit in a group; a determination unit configured to determine a transmission schedule for each of a plurality of groups managed by the management unit so that the department counter information is transmitted from the plurality of image forming apparatuses belonging to each of the plurality of groups at intervals of at least a first time period; and a transmission unit configured to generate information for setting the transmission schedule for each of the plurality of groups determined by the determination unit to the image forming apparatuses belonging to each of the plurality of groups, and transmit the generated information to the image forming apparatuses belonging to each of the plurality of groups in response to a request therefrom, wherein, when the plurality of image forming apparatuses identified by the identification unit is equal to greater than the predetermined maximum value, the management unit manages the plurality of image forming apparatuses identified by the identification unit in a plurality of different groups, and wherein, when the plurality of image forming apparatuses identified by the identification unit are managed in the plurality of different groups by the management unit, the determination unit determines the transmission schedule for each of the plurality of groups such that transmission is performed at intervals of a second time period which is shorter than the first time period.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 8A to 8C illustrate exemplary tables managed in a database.

FIG. 12 illustrates an exemplary user interface (UI) displayed in a display unit.

FIG. 13 illustrates transmission scheduling processing applied to each image forming apparatus.

FIG. 14 illustrates transmission scheduling processing applied to each image forming apparatus.

FIG. 15 illustrates transmission scheduling processing applied to each image forming apparatus.

FIG. 16 illustrates transmission scheduling processing applied to each image forming apparatus.

FIG. 17 illustrates transmission scheduling processing applied to each image forming apparatus.

FIG. 18 illustrates transmission scheduling processing applied to each image forming apparatus.

FIG. 19 illustrates transmission scheduling processing applied to each image forming apparatus.

DESCRIPTION OF THE EMBODIMENTS

Various exemplary embodiments, features, and aspects of the invention will be described in detail below with reference to the drawings.

Figure 1:
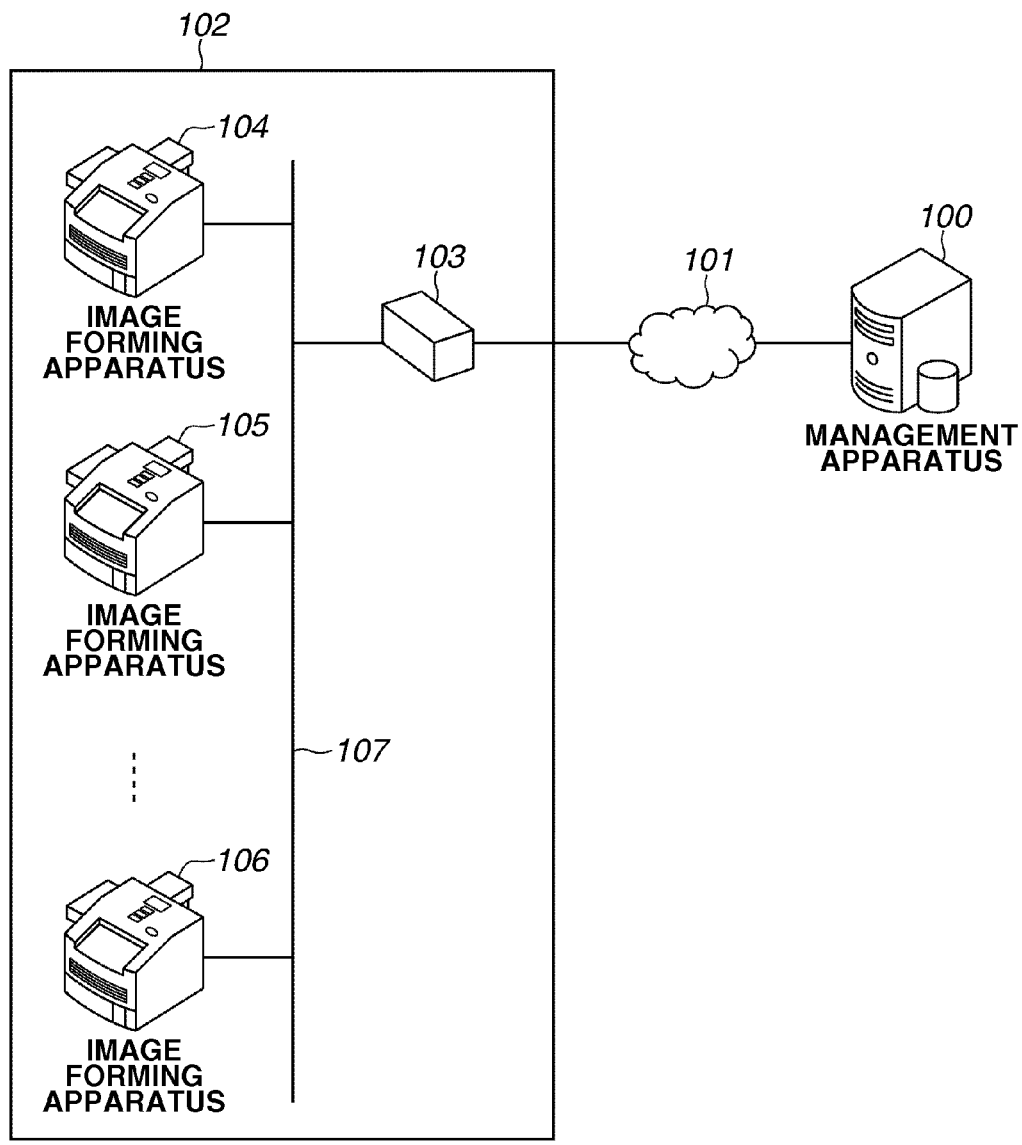
FIG. 1 illustrates an exemplary management system.

FIG. 1 illustrates an exemplary management system according to an exemplary embodiment of the present invention. The exemplary management system includes a plurality of image forming apparatuses which can be a monitoring target and are capable of department management, and a management apparatus which receives and manages operation information transmitted from the image forming apparatuses. More specifically, in the exemplary management system, a management apparatus 100 is connected with a plurality of image forming apparatuses 104 to 106 via the Internet 101, a gateway 103, and a network 107, to collect and manage department counter information acquired from the image forming apparatuses 104 to 106. The management apparatus 100 and each of the image forming apparatuses are configured to communicate with each other by, for example, the Hypertext Transfer Protocol (HTTP). The gateway 103 includes a router, a proxy server, a fire wall, and so on.

An image forming apparatus capable of department management has a plurality of department IDs registered therein, and includes a department management function for counting and managing counter information as a department counter for each department ID, for example, at the time of printing. A department ID common to the plurality of image forming apparatuses may be registered therein and used for system operations.

Referring to FIG. 1, the image forming apparatuses 104 to 106 are multifunction peripherals (MFPs). Each of the image forming apparatuses 104 to 106 may be a single function peripheral (SFP) such as a printer and a copying machine.

In response to a command request from the image forming apparatuses 104 to 106, the management apparatus 100 connected to the Internet 101 instructs a relevant module to transmit requested data. Further, the management apparatus 100 regularly or irregularly receives operation information including the department counter information and error information from the image forming apparatuses 104 to 106 according to below described schedule setting, and manages these pieces of information by using a database. There is no limitation on the number of image forming apparatuses.

In the thus-configured management system, the image forming apparatuses 104 to 106 transmit the operation information including counter information and error information managed thereby to the management apparatus 100 according to the schedule setting specified by the management apparatus 100. The management apparatus 100 classifies and stores the received operation information in the database for management. Based on the database, the management apparatus 100 performs billing processing according to an amount of sheets used by each customer. The image forming apparatuses 104 to 106 receive information about the department counter managed for each registered department ID, from the management apparatus 100, and transmit necessary information to the management apparatus 100 according to the schedule setting.

In this case, the image forming apparatuses 104 to 106 transmit the counter information for all department IDs registered therein to the management apparatus 100. When a department ID is deleted in the image forming apparatuses 104 to 106, the image forming apparatuses 104 to 106 do not transmit operation information related to the deleted department ID to the management apparatus 100 in subsequent transmission.

The management apparatus 100 can recognize that the department ID has been deleted from a certain image forming apparatus based on the fact that transmission of the department ID is not performed. Further, by identifying a department ID with which operation information remains unchanged (the counter information is not counted up), the management apparatus 100 can recognize that the department ID is not utilized at all by any image forming apparatus.

Figure 2:
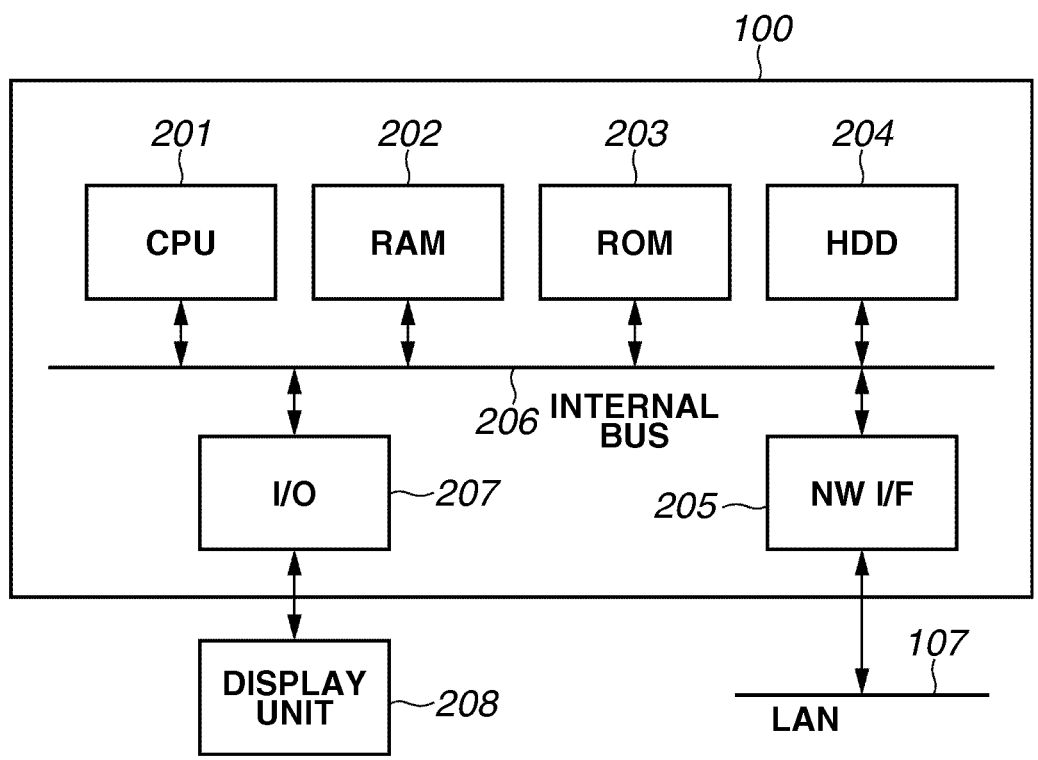
FIG. 2 is a block diagram illustrating a hardware configuration of a management apparatus.

FIG. 2 is a block diagram illustrating a hardware configuration of the management apparatus 100 illustrated in FIG. 1. The management apparatus 100 includes the following hardware resources. The management apparatus 100 can be configured, for example, by a general personal computer (PC) which includes a central processing unit (CPU) 201, a random access memory (RAM) 202, a read-only memory (ROM)

203, a hard disk drive (HDD) 204, a network interface (NW I/F) 205, an internal bus 206, and an input/output (I/O) interface 207.

Referring to FIG. 2, the ROM 203 stores a program (including below described modules for attaining processing of FIG. 4) which is executed by the CPU 201. The CPU 201 comprehensively controls devices connected thereto via the internal bus 206. The RAM 202, the ROM 203, the HDD 204, and the NW I/F 205 are connected to the internal bus 206. A display unit 208 is connected to the internal bus 206 via the I/O interface 207 and displays an application-based user interface.

The NW I/F 205 bidirectionally exchanges data with external network devices or PCs via the network 107 illustrated in FIG. 1. External network devices may include the image forming apparatuses 104 to 106 illustrated in FIG. 1.

The HDD 204 serves as an external storage device to store operation information acquired from the image forming apparatuses 104 to 106. The CPU 201 can record image data on the HDD 204. Further, the HDD 204 stores an operating system (OS) which is loaded into the RAM 202 to manage various data and execution of various applications. The CPU 201 loads applications into the RAM 202 and execute them to perform data communication, data calculation, and data display processing. The thus-configured management apparatus 100 performs the following department counter monitoring processing.

More specifically, in the management apparatus 100, identification information of each image forming apparatus (serial number, internet protocol (IP) address, media access control (MAC) address, product name, and so on) is registered. When the management apparatus 100 receives data from each image forming apparatus, the management apparatus 100 stores the data in the database based on the identification information included therein.

When the management apparatus 100 receives the department counter information from an image forming apparatus, the management apparatus 100 registers a department ID corresponding to the received the department counter information and stores new department counter information in the database. Since a tally over a plurality of departments and a tally on a department basis are suitably tallied up in a format requested from a display screen of the display unit 207 of the management apparatus 100, the tallies are not stored in the database.

Figure 3:
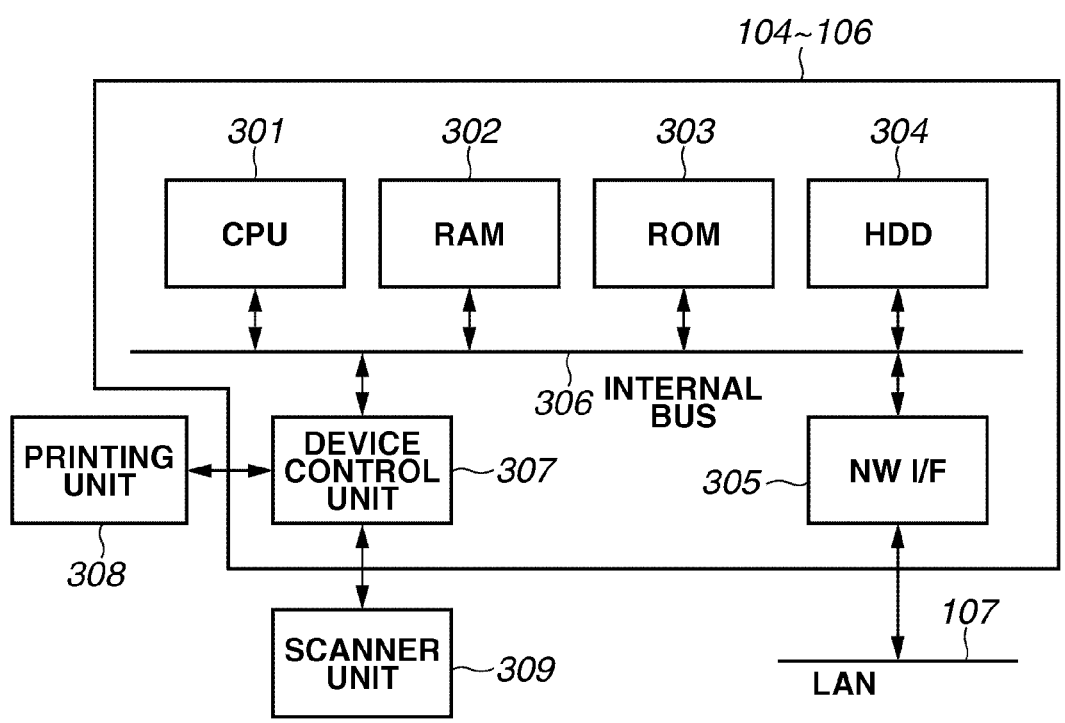
FIG. 3 is a block diagram illustrating a hardware configuration of an image forming apparatus.

FIG. 3 is a block diagram illustrating a hardware configuration of the image forming apparatuses 104 to 106 illustrated in FIG. 1. Since each of the image forming apparatuses 104 to 106 has a basically similar configuration, description will be made below only of the image forming apparatuses 104.

The image forming apparatus 104 includes a CPU 301 which executes a program (including a program for attaining below described processing of FIG. 5) stored in a ROM 303 to comprehensively control devices via an internal bus 306.

A RAM 302, the ROM 303, a HDD 304, a NW I/F 305, and a device control unit 307 are connected to the internal bus 306. A printing unit 308 and a scanner unit 309 are connected to the internal bus 306 via the device control unit 307.

The RAM 302 serves as a memory and a work area for the CPU 301. The device control unit 307 controls the printing unit 308 and/or the scanner unit 309 to control image processing.

The NW I/F 305 bidirectionally exchanges data with external network devices or PCs via the network 107. The HDD 304 serves as an external storage device to store image data or the like. Further, the HDD 304 can store the operation information including the department counter information, system information, and status information. The CPU 301 can perform processing for recording image data in the HDD 304.

Figure 4:
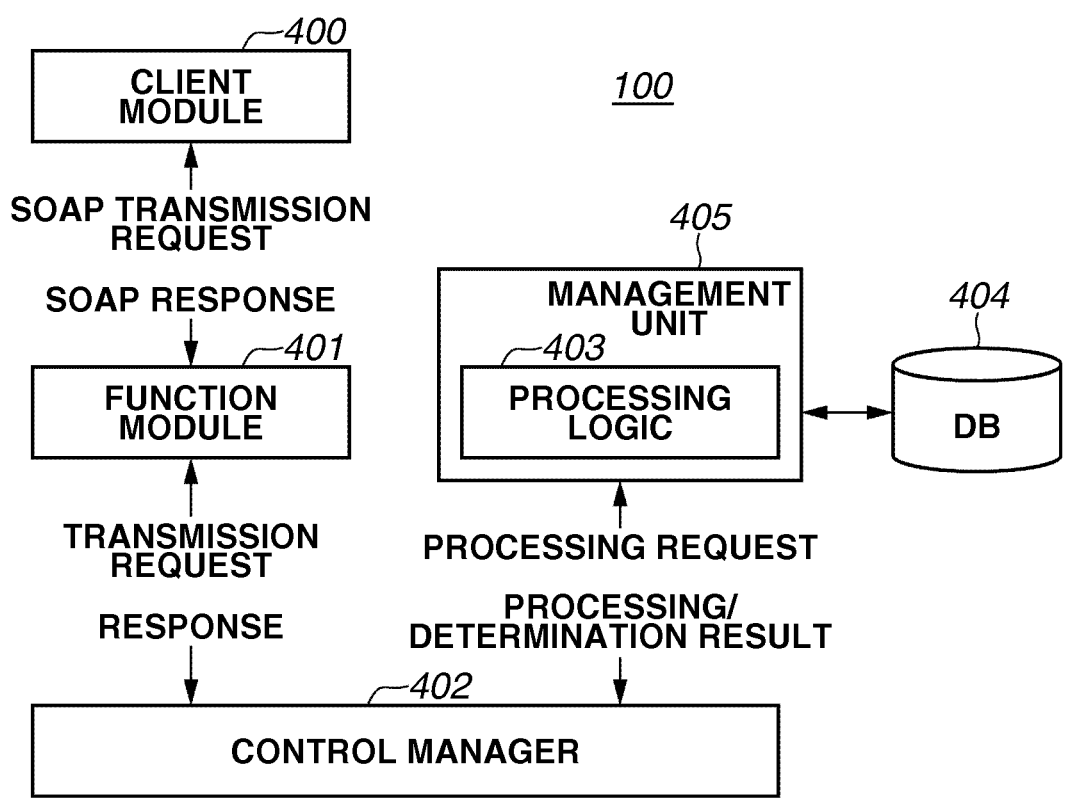
FIG. 4 is a block diagram illustrating software modules of the management apparatus.

FIG. 4 is a block diagram illustrating software modules of the management apparatus 100 illustrated in FIG. 1.

Referring to FIG. 4, a HyperText Transfer Protocol (HTTP)/Simple Object Access Protocol (SOAP) client module 400 (hereinafter referred to as client module) receives a transmission request from a SOAP function module (hereinafter referred to as function module) 401 and creates a markup language description based on a predetermined schema. These protocols are used by the management system to invoke data and services between the image forming apparatuses 104 to 106 and the management apparatus 100.

Schema specifications for each piece of information are stored in advance in a storage unit, for example the ROM 203 and the HDD 204, that can be accessed by the client module 400.

The client module 400 transmits the created markup language description data to specified image forming apparatuses 104 to 106 via the Internet 101.

An exemplary markup language description is an extensible Markup Language (XML). Although description is made that the function module 401 notifies the client module 400 of various pieces of information, it is also possible that the client module 400 itself acquires the above described information from the function module 401.

The client module 400 receives SOAP information, extracts data from the markup language description based on a predetermined schema, and transfers the extracted data to the function module 401.

A database 404 stores acquired operation information, internal operation logs, and communication history (pass/fail). For example, information about the image forming apparatus 104 to be managed, identification information (department ID) of the department counter, and relevant values are stored in the database 404 in an associated way. The operation information according to the present exemplary embodiment includes at least one department counter. The department counter information which is identified by the department ID includes an amount of printed sheets and an amount of printed sides in actual image forming. The schedule setting for acquiring the operation information from the image forming apparatus 104 may be automatically updated based on below described processing by the management apparatus 100.

The information about the image forming apparatus registered in the database includes apparatus-specific information (IP address, MAC address, device serial number, product name, product type, etc.) which are required for management.

A management unit 405 is a module which stores operation information acquired from the image forming apparatuses 104 to 106 in the database 404 and controls an output therefrom based on a processing logic 403. The management unit 405 also performs below described scheduling processing. The management unit 405 receives a processing request from a control manager 402 at timing, for example, when the management apparatus 100 receives the operation information, and performs various pieces of processing based on the processing logic 403.

Figure 5:
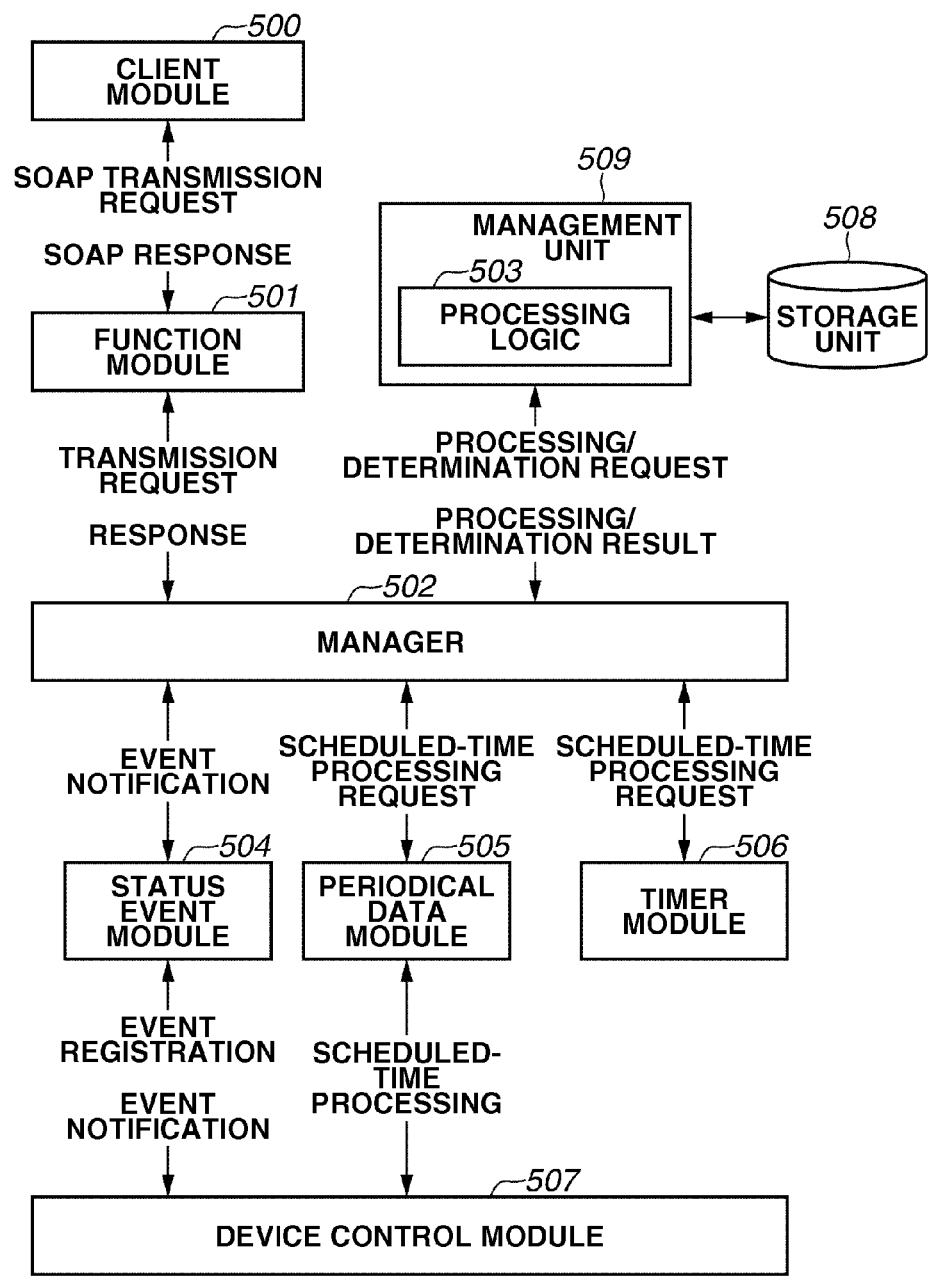
FIG. 5 is a block diagram illustrating software modules of the image forming apparatus.

FIG. 5 is a block diagram illustrating software modules of the image forming apparatus 104 illustrated in FIG. 1. Referring to FIG. 5, a function module 501 requests a client module 500 to create information received from a manager module 502 and a markup language description and to transmit the created markup language description to the specified management apparatus 100. The information about the specified management apparatus may be stored in advance in the client module 500 or set at the time of installation to the client module 500.

The client module 500 receives information from the function module 501 and creates a markup language description based on a predetermined schema. Schema specifications for each piece of variable information and fixed information is stored in advance in a storage unit that can be accessed by a HTTP/SOAP client module.

The client module 500 transmits data of the created markup language description to the specified management apparatus 100. An exemplary markup language description is XML. Above description is made that the function module 501 notifies the client module 500 of various pieces of information.

For example, it is also possible that the client module 500 itself acquires the above described information from the function module 501.

A device control module 507 serves as an interface between the device control unit 307 and the printing unit 308 illustrated in FIG. 3. Therefore, status information and counter information, including an error detected in the printing unit 308, in the image forming apparatuses 104 to 106 are notified via the device control module 507.

The counter information includes values of various counters such as a counter indicating the number of sheets used for image forming by the image forming apparatuses 104 to 106, a part counter indicating usage of parts in the apparatuses, and a function counter indicating usage of other functions.

Further, the error information includes a state of printing jobs accumulated in the image forming apparatuses 104 to 106 and failures occurring in the image forming apparatuses 104 to 106.

Failures in the image forming apparatuses 104 to 106 include a hard disk error, a service call error such as a billing counter error, a paper jam, a low toner warning, and so on. Failures in the image forming apparatuses 104 to 106 further include door opening and exceeded number of sheets loaded on a discharge tray.

A status event module 504 notifies the manager module 502 of an error information list (a plurality of types of error information) received from the device control module 507.

A periodical data module 505 notifies the manager module 502 of the counter information acquired from the device control module 507. To periodically acquire the counter information, the manager module 502 requests the periodical data module 505 to transmit the counter information based on time set in a timer module 506.

A management unit 509 stores information in a storage unit 508 and controls an output therefrom based on a processing logic 503. The management unit 509 stores the operation information including the acquired department counter information in the storage unit 508 via the processing logic 503. When the operation information is transmitted to outside, the management unit 509 transfers the stored operation information to the function module 501 following an instruction from the manager module 502.

The storage unit 508 including a hard disk and a nonvolatile memory such as a static random access memory (SRAM) stores the error information, the counter information, the fixed and variable information necessary for processing, an internal operation log, and communication history (pass/fail) separately for each department. Accordingly, when the power of the image forming apparatus 104 is turned OFF and then back ON, a former condition can be maintain by loading stored data (saved when the power is turned OFF) from the storage unit 508.

Figure 6:
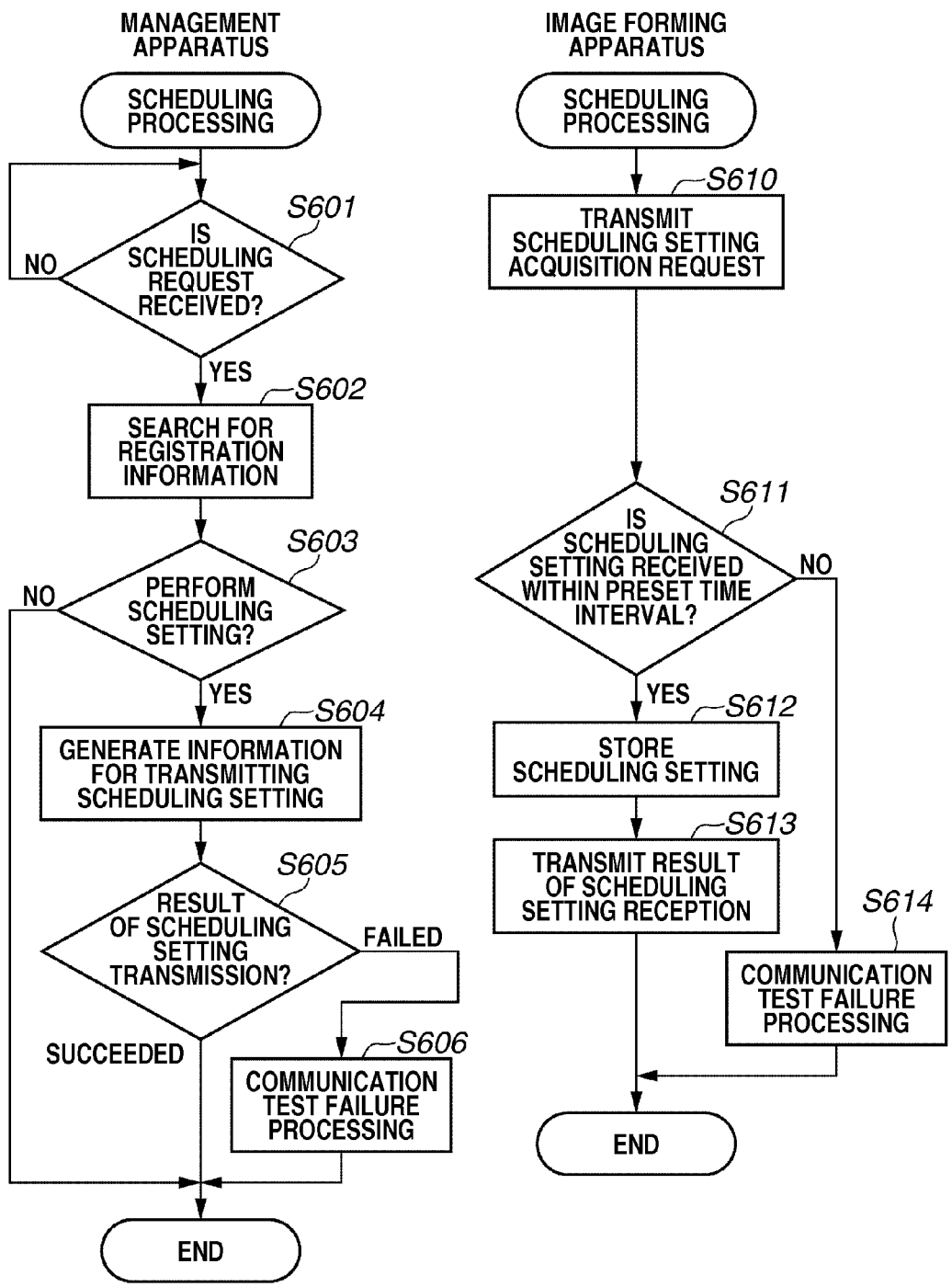
FIG. 6 is a flow chart illustrating a data processing procedure performed by the management system.

Scheduling processing in the management system will be described below. FIG. 6 is a flow chart illustrating an exemplary data processing procedure performed by the management system according to the present exemplary embodiment. This exemplary data processing includes scheduling and transmission of the schedule when the image forming apparatus 104 which performs department management is installed for the first time and when schedule change processing (hereinafter referred to as re-scheduling processing) is performed during operation.

Each of steps S601 to S606 is attained when the CPU 201 of the management apparatus 100 loads a control program and the above described modules into the RAM 202 and then executes them. Each of steps S610 to S614 is attained when the CPU 301 of the image forming apparatuses 104 to 106 loads a control program and the above described modules into the RAM 302 and then execute them.

The management apparatus 100 is assumed to perform scheduling processing in different ways for the following two cases. In one case, the image forming apparatus 104 requests schedule acquisition when information about the image forming apparatus installed on site is not registered in the management apparatus 100. In the other case, the image forming apparatus installed on site requests schedule acquisition when information about the image forming apparatus to be installed is registered in advance in the management apparatus 100.

In the latter case, it is possible to identify a user who uses a newly installed image forming apparatus on site and then comprehend other image forming apparatuses used by the user. Therefore, the management apparatus 100 can apply a schedule setting to the image forming apparatus which requests schedule acquisition at similar or close time to that for other image forming apparatuses. Therefore, the management apparatus 100 can acquire the operation information at almost the same timing from the image forming apparatuses which are in a same user environment.

In the former case, the management apparatus 100 cannot identify which user uses the image forming apparatus. Therefore, based on schedule settings of the image forming apparatuses which are already installed on site, the management apparatus 100 transmits schedule setting information to the image forming apparatus so that operation information transmission schedule is dispersed. Accordingly, possibility of generation of useless communication load caused by setting a similar schedule to irrelevant image forming apparatuses can be reduced. Even with image forming apparatuses installed in the same user environment, there may be a case where some image forming apparatuses transmit the operation information in the morning and the remaining image forming apparatuses transmit the operation information in the evening.

A flow of scheduling between the management apparatus 100 and the image forming apparatus 104 will be described below. The management apparatus 100 waits for a scheduling request from the image forming apparatus 104. This is because, in the configuration of the management system illustrated in FIG. 1, the management apparatus 100 has difficulty in directly communicating with the image forming apparatus 104 beyond a firewall of the gateway 103.

Therefore, in step S610, the image forming apparatus 104 transmits a schedule setting acquisition request to the management apparatus 100. More specifically, the client module 500 illustrated in FIG. 5 outputs the schedule setting acquisition request to the management apparatus 100. The client module 500 outputs data based on a markup language.

If there are a large number of image forming apparatuses subjected to initial scheduling by the management apparatus 100, it may be possible to, for example, group them in units of a predetermined number of apparatuses in order of device ID and then temporarily set a schedule to the grouped image forming apparatuses. This allows the operation information managed by the image forming apparatuses to be transmitted to the management apparatus 100.

Thus, once the schedule for transmitting the operation information to the management apparatus 100 is set to the image forming apparatus 104, the image forming apparatus 104 periodically transmits operation information to the management apparatus 100. In this case, at the time of operation information transmission, the image forming apparatus 104 changes the schedule setting for transmitting the operation information or checks whether the schedule needs to be changed. Processing for changing the schedule will be described below.

In step S601, the management apparatus 100 waits for the schedule setting acquisition request from the image forming apparatus 104. When the management apparatus 100 receives the schedule setting acquisition request via the client module 400 (YES in step S601), the processing proceeds to step S602. In step S602, the management apparatus 100 searches for registration information about the image forming apparatus 104 which requested schedule setting acquisition. More specifically, the management unit 405 searches for information about managed image forming apparatuses and their schedule settings in the database 404 using the processing logic 403.

In step S603, the management unit 405 determines whether a schedule setting is to be applied to the image forming apparatus 104, based on the information acquired by the search in step S602 using the processing logic 403.

Scheduling may not be necessary, for example, when scheduling has already been performed and a relevant setting does not need to be changed, or when a schedule update function is disabled. A re-scheduling flag for enabling (ON) or disabling (OFF) the schedule update function is managed by the management unit 405.

When the management unit 405 determines that the schedule setting is to be changed (YES in step S603), the processing proceeds to step S604. In step S604, the management unit 405 generates information to be transmitted to set a schedule setting previously stored in the database 404 to the image forming apparatus 104.

Then, the client module 400 transmits the generated information to the image forming apparatus 104. In step S605, the control manager 402 determines whether transmission has been successfully completed or failed. When the control manager 402 determines that a response of successful reception is received from the image forming apparatus 104 (SUCCEEDED in step S605), the present processing in FIG. 6 is terminated.

When the control manager 402 determines that a response of reception failure is received from the image forming apparatus 104 or that no response is received therefrom because of a communication failure (FAILED in step S605), the processing proceeds to step S606. In step S606, the management unit 405 records in the database 404 that transmission of the information for schedule setting has failed, using the processing logic 403. Then, the present processing in FIG. 6 is terminated.

In step S610, on the other hand, the image forming apparatus 104 waits for a response from the management apparatus 100 to the schedule setting acquisition request.

In step S611, the management unit 509 determines whether the image forming apparatus 104 has received the schedule setting from the management apparatus 100 within a preset time interval, using the processing logic 503. When the management unit 509 determines that the schedule setting from the management apparatus 100 is received within the preset time interval (YES in step S611), the processing proceeds to step S612.

In step S612, the management unit 509 stores the schedule setting in the storage unit 508 of the image forming apparatus 104. In step S613, the management unit 509 notifies the management apparatus 100 of a result of schedule setting reception via the function module 501 and the client module 500. Then, the present processing in FIG. 6 is terminated. The image forming apparatus 104 notifies the management apparatus 100 not only of success but also of failure of the schedule setting reception.

When the management unit 509 determines that the schedule setting cannot be received from the management apparatus 100 within the preset time interval (NO in step S611) using the processing logic 503, the processing proceeds to step S614. In step S614, the management unit 509 performs processing which is executed in case of failure during a communication test to record a failure of communication with the management apparatus 100. Then, the present processing in FIG. 6 is terminated.

Upon completion of the processing described with reference to FIG. 6, the management system starts operation, and transmission of the operation information including the department counter information is started. Accordingly, the management apparatus 100 can determine actual operation state by tallying up the department counter information stored in the database 404.

The department counter information for the department ID registered when the image forming apparatus 104 was installed on site may remain unchanged because of user's convenience. For example, when a user of the department ID cannot access the image forming apparatus in which the department ID is registered because of its location or when the department ID is left unused due to relocation of the image forming apparatus 104, the department counter information may remain unchanged.

Further, a new department ID may be added to the image forming apparatus, and transmission of the department counter information for the new department ID may be started at a certain time.

Therefore, the management apparatus 100 repeats the following department counter monitoring processing and re-grouping determination processing in the operation to determine whether it is necessary to review schedule settings of the image forming apparatuses to be monitored by the management apparatus 100. In the present exemplary embodiment, a schedule at the same or close time is set to the image forming apparatuses which are grouped into one group. By performing re-grouping and re-scheduling based on the determination of the management apparatus 100, the department counters can be suitably tallied up in consideration of communication load.

The following describes processing performed by the management apparatus 100 to receive the operation information including the department counter transmitted from the image forming apparatuses 104 to 106 based on a schedule setting, and to monitor the received operation information.

Figure 7:
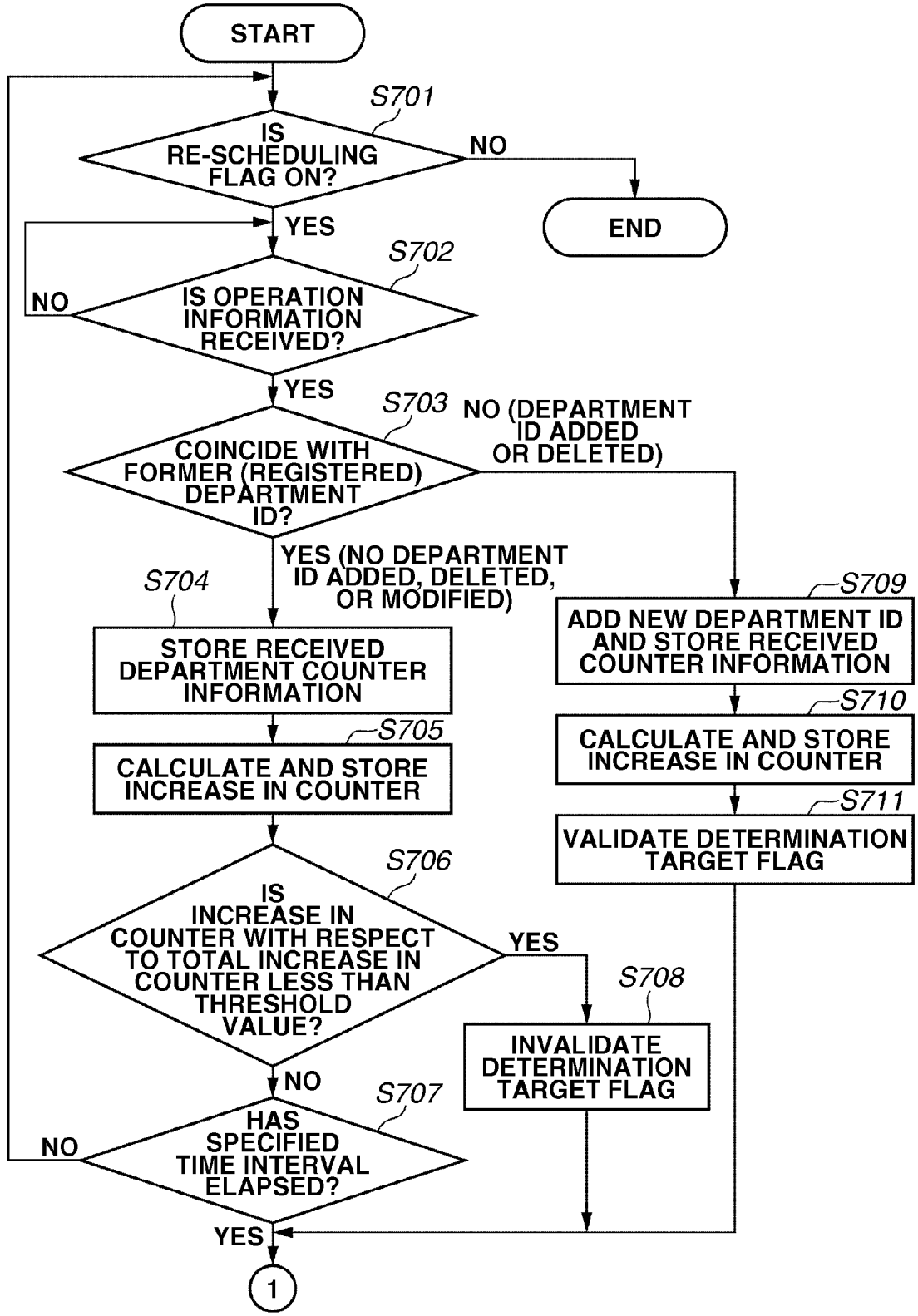
FIG. 7 is a flow chart illustrating a data processing procedure performed by the management apparatus.

FIG. 7 is a flowchart illustrating an exemplary data processing procedure performed by the management apparatus 100 according to the present exemplary embodiment. The management apparatus 100 performs this processing when re-scheduling processing is performed for the image forming apparatus 104 which performs department management. For example, the management apparatus 100 may periodically review scheduling at predetermined intervals. Further, the management apparatus 100 may perform the present processing in FIG. 7 at a timing of an inquiry for the schedule setting transmitted from the image forming apparatus 104 as well as at periodical reception of the operation information.

Each of steps S701 to S711 is attained when the CPU 201 loads the modules of FIG. 4 into the RAM 202 and then executes them.

In step S701, the control manager 402 determines whether resetting (re-scheduling) processing of the operation information transmission schedule to the image forming apparatuses 104 to 106 is automatically performed. More specifically, when a re-scheduling performance flag managed on the RAM 202 is set to ON (1) (YES in step S701), the control manager 402 determines that re-scheduling processing is automatically performed.

When the re-scheduling performance flag is set to OFF (0) (NO in step S701), the control manager 402 determines that re-scheduling processing is not automatically performed. Then, the present processing in FIG. 7 is terminated without performing subsequent processing.

The re-scheduling performance flag is set to OFF (0) to cope with a case where department management is not to be performed or a case where only one or a very small number of image forming apparatuses is installed on site.

When the re-scheduling performance flag is set to ON (1) (YES in step S701), the control manager 402 recognizes that re-scheduling processing is automatically performed. Then the processing proceeds to step S702.

In step S702, the management unit 405 determines whether the operation information has been received from the image forming apparatus 104 since the present processing in FIG. 7 is last performed. This determination may be made immediately after receiving the operation information, or particularly at timing not dependent on a reception timing of the operation information.

When the management unit 405 determines that operation information has not been received since the present processing in FIG. 7 is last performed (NO in step S702), the management unit 405 waits for reception of the operation information. When the operation information has been received from the image forming apparatus 104 (YES in step S702), the processing proceeds to step S703.

In step S703, the management unit 405 determines whether all department IDs of the department counter included in the operation information received from the image forming apparatus 104 coincide with department IDs already registered in the database 404. When the management unit 405 determines that all the received department IDs coincide with those registered in the database 404 (YES in step S703), the processing proceeds to step S704.

In step S704, the management unit 405 stores the information on the received department counter in the database 404, and the processing proceeds to step S705. In step S705, the management unit 405 calculates an increase in each department counter from the value received last, and stores it in the database 404 as an increased counter value.

In step S706, the processing logic 403 compares the increase in the department counter with a total increase in counter of the image forming apparatuses which include the department ID currently being processed, to determine whether the increase in the department counter to the total increase in the counter is less than a threshold value (default value). For example, if the image forming apparatus 104 prints 30000 sheets per month and a certain department ID is used for two sheets per month, the management unit 405 determines that there is no increase in counter and performs re-scheduling processing for the image forming apparatus 104.

An actual threshold value is stored in a scheduling update parameter management table illustrated in FIG. 8B of the database 404, and can be changed according to the system operation state by an administrator.

The processing logic 403 multiplies a maximum value for determining an increase threshold value by an increase threshold value parameter (%) to obtain a product of the two values. The product value is an increase in counter which is used to determine whether it is increased. FIGS. 8A to 8C will be described in detail below. When the management unit 405 determines that the increase in department counter with respect to the total increase in counter is less than the increase threshold value (YES in step S706), in other words, there is little increase in counter, the processing proceeds to step S708. When it is necessary to recognize only a case where the image forming apparatus 104 prints no sheet, that is, the department counter remains unchanged, the increase threshold value may be set to zero.

In step S708, the management unit 405 invalidates a determination target flag to delete the department ID determined in step S706 to have little increase in counter from the department IDs subjected to determination in below described grouping processing.

On the other hand, when the management unit 405 determines that the increase in department counter with respect to the total increase in counter exceeds the increase threshold value (NO in step S706), the processing proceeds to step S707. In step S707, the management unit 405 determines whether a specified time interval has elapsed since the management unit 405 performed last re-scheduling processing. This determination step is provided to automatically perform scheduling processing after a certain time interval has elapsed even when the operation information is continuously received without change in the department ID corresponding to the received department counter information.

When the management unit 405 determines that the specified time interval has not elapsed (NO in step S707), the management apparatus 100 assumes that timing for reviewing grouping has not yet come. Then, the processing returns to step S701.

On the other hand, when the management unit 405 determines that the specified time interval has elapsed (YES in step S707), the processing proceeds to re-scheduling processing illustrated in FIG. 9, which is described below. In the present exemplary embodiment, the time interval can be arbitrarily specified. For example, a short time interval can be specified so that scheduling processing is performed at an early stage.

In step S703, when the management unit 405 determines that not all of the department IDs of the department counter included in the received operation information coincide with the department IDs registered in database 404 (NO in step S703), the processing proceeds to step S709.

If not all of the department IDs of the department counter included in the received operation information coincide with the department IDs registered in database 404, the management unit 405 determines that any department ID has been added or deleted. More specifically, it means that the department counter information for a newly registered department ID on the image forming apparatus 104 has been transmitted or that the department ID has been deleted on the image forming apparatus 104 and relevant information is no longer transmitted.

In step S709, the management unit 405 adds a new department ID, and stores the information about the received department counter in the database 404.

When the management unit 405 determines that any department ID has been deleted (the number of department IDs has decreased), the management unit 405 invalidates the determination target flag for the relevant department ID to delete the deleted department ID from the department IDs subjected to below described re-scheduling processing. The stored department counter information is remained because it is necessary for tally processing.

In step S710, the management unit 405 calculates an increase in counter from the value of the department counter last received, and stores it in the database 404. Further, for a department counter corresponding to the new department ID, the management unit 405 adds a new management item to the database 404 and stores the value of the received department counter as an increase in counter.

In step S711, the management unit 405 validates the determination target flag for the department counter of the new department ID. Then, the processing proceeds to the grouping processing of FIG. 9. FIGS. 8A to 8C illustrate exemplary tables managed in the database 404 of FIG. 4. FIG. 8A illustrates a table for managing the department counter information of an image forming apparatus. More specifically, the table is used to manage a unit number of the image forming apparatus as identification information, a schedule setting applied thereto, a department ID registered therefor, and relevant values (on a daily basis).

This table is used to manage the determination target flag for determining whether the image forming apparatus is subjected to grouping for each department ID. The table is also used to manage an increase in counter from the value of the department counter last received, and information indicating a group to which the image forming apparatus belongs.

The determination target flag stores information indicating whether the information corresponding to the department ID is used in grouping processing.

A column "Increase in counter" stores an increase in counter from the value when re-scheduling processing was performed. This column is referenced, for example after a time interval illustrated in FIG. 8B has elapsed, to determine whether the department ID is utilized by the user.

A column "Group" stores group information set by the grouping processing according to the present exemplary embodiment. More specifically, the group information is G01, G02, G03, and so on as illustrated from FIG. 13 on. A same schedule can be set by setting G01=G03 as the group information.

FIG. 8B illustrates an exemplary table for managing scheduling update parameters. The table is used to manage a parameter "Re-scheduling flag" for determining whether scheduling is automatically performed. The table is also used to manage a time interval which can be a basis for determining tendency of increase in the department counter. The table also manages a maximum value (maximum number of sheets) and a threshold value of increase in the department counter with respect to maximum value (%). These two parameters are used to detect a department ID almost not used which may be subjected to re-scheduling.

A parameter "Interval (hours)" is used to periodically review scheduling. In the table, 720 days (or 30 days) are set as an initial value. Parameters "Maximum value (sheets)" and "Threshold value of increase in counter with respect to maximum value (%)" are used to determine that a certain department ID is not used in the image forming apparatus during a predetermined time interval.

FIG. 8C illustrates an exemplary table for managing a maximum number of image forming apparatuses that can be registered as one group. Even if all department IDs included in the image forming apparatuses are the same, the image forming apparatuses more than the number set in a parameter "Maximum number of image forming apparatuses per group" cannot be registered in one group. This parameter is used to prevent the same schedule setting from being applied to excessive number of image forming apparatuses.

According to the setting of the parameter "Maximum number", a schedule setting at same time cannot be applied to some of the plurality of image forming apparatuses which include common department IDs. However, since the image forming apparatuses grouped as another group because of the parameter "Maximum number" can be recognized, a schedule can be set for each group at similar or close time.

Processing for grouping the image forming apparatuses will be described below with reference to FIG. 9. FIG. 9 is a flow chart illustrating an exemplary data processing procedure performed by the management apparatus according to the present exemplary embodiment. In this example, the management apparatus 100 performs processing to determine whether the image forming apparatuses are suitably grouped based on the department counter information received from each image forming apparatus. Each of steps S801 to S814 is attained when the CPU 201 loads the modules of FIG. 4 into the RAM 202 and then executes them.

In step S801, the management unit 405 sets an image forming apparatus (for example, any one of the image forming apparatuses 104 to 106) as a target image forming apparatus for the present processing. The target image forming apparatus can be determined in any order.

In step S802, the management unit 405 extracts a range of the department IDs (department Nos. X to Y in the present exemplary embodiment) subjected to the present processing.

In step S803, the management unit 405 checks whether a department ID (for example, department No. X) among the ones extracted in step S802 exists in registration information of other image forming apparatuses by searching the database 404. More specifically, the management unit 405 searches the database 404 for information about the image forming apparatuses registered therein as the target image forming apparatuses to be managed by the management apparatus 100. When the department ID exists in the registration information of the image forming apparatus, it can be understood that the management apparatus periodically receives the department counter information corresponding to the department ID from the image forming apparatus.

Then, the management apparatus creates a list of the image forming apparatuses which include the department ID in their registration information. When the determination target flag is invalidated for the department ID found in the database 404, the management unit 405 does not register in the list the image forming apparatus corresponding to the department ID.

In step S804, based on the list created in step S803, the management unit 405 assigns the same group number to the image forming apparatuses which transmitted the department counter information for the same department ID. In step 805, the management unit 405 validates a processing completion flag indicating that the image forming apparatuses has been assigned a group number (grouping of the image forming apparatus is completed).

In step S806, the management unit 405 determines whether each of steps S803 to S805 is completed for all department IDs. For example, the management unit 405 checks whether a target department ID coincides with the last department ID (department No. Y) extracted in step S802.

When the management unit 405 determines that each of steps S803 to S805 is completed for all department IDs (YES in step S806), the processing proceeds to step S807. When the management unit 405 determines that there is an unprocessed department (NO in step S806), the processing proceeds to step S810 to set the unprocessed department ID as a target of subsequent processing. Then, the processing returns to step S803.

In step S807, the management unit 405 determines whether the list of image forming apparatuses corresponding to the group number has been changed since the last grouping processing. When the management unit 405 determines that the list remains unchanged (NO in step S807), it is recognized that re-scheduling is not necessary, and the processing proceeds to step S808. When the management unit 405 determines that the list has been changed (YES in step S807), the processing proceeds to step S811.

In step S808, the management unit 405 determines whether the processing completion flag for any image forming apparatus is invalidated in relation to grouping processing in the tables managed in the database 404. When the management unit 405 determines that there is any image forming apparatus in which the processing completion flag is invalidated in the list (YES in step S808), the processing proceeds to S809 to set the image forming apparatus as a target image forming apparatus for subsequent processing. Then, the processing returns to step S802.

On the other hand, when the management unit 405 determines that there is no image forming apparatus in which the processing completion flag is invalidated in the list (NO in step S808), the processing proceeds to below described group division processing.

In step S811, the management unit 405 determines whether the group corresponding to the group number assigned to the target image forming apparatus is divided in the last grouping processing, and a below described approximated schedule setting is applied to this group. Processing of group division and approximated scheduling will be described below with reference to FIG. 10.

When the management unit 405 determines that the approximated schedule setting is applied to this group (YES in step S811), the processing proceeds to step S812 to extract groups to which the approximated schedule setting is applied and with which the list of image forming apparatuses remains unchanged.

In step S813, the management unit 405 assigns the group number of the target image forming apparatus to the groups extracted in step S812. This processing is performed to set all image forming apparatuses of each group which are applied the approximated schedule setting in the last processing to be subjected to re-grouping in the current processing.

In step S814, the management unit 405 sets the re-scheduling flag of the relevant groups managed in the database 404 to ON, and the processing proceeds to step S808.

On the other hand, when the management unit 405 determines that this group is not subjected to the approximated schedule setting (NO in step S811), the processing proceeds to step S814 to set the re-scheduling flag only for that group to ON. Then, the processing returns to step S808.

In the grouping processing described with reference to FIG. 9, when the number of image forming apparatuses belonging to one group is equal to or greater than a predetermined fixed number, the management unit 405 groups these apparatuses into a plurality of groups.

Figure 10:
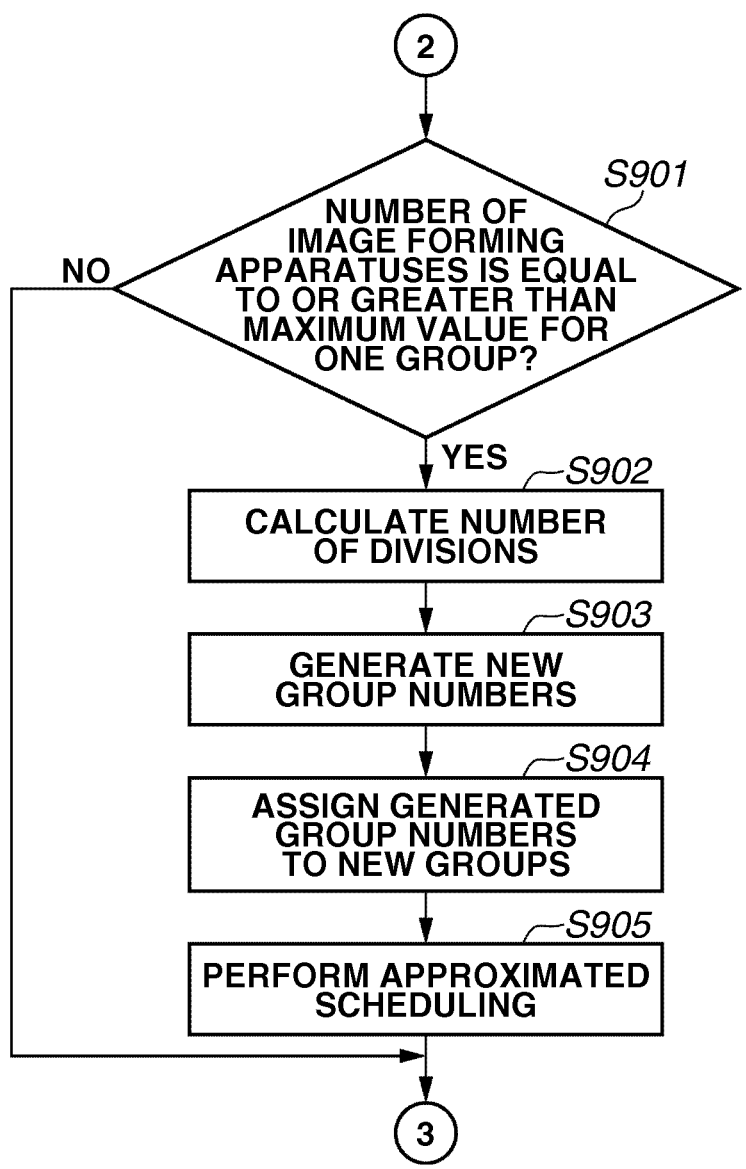
FIG. 10 is a flow chart illustrating a data processing procedure performed by the management apparatus.

FIG. 10 is a flow chart illustrating an exemplary data processing procedure performed by the management apparatus according to the present exemplary embodiment. In this example, the management apparatus performs processing to determine whether the maximum number of image forming apparatuses that can be registered in the above described group is exceeded. Each of steps S901 to S905 is attained when the CPU 201 loads the modules of FIG. 4 into the RAM 202 and then executes them.

Figure 9:
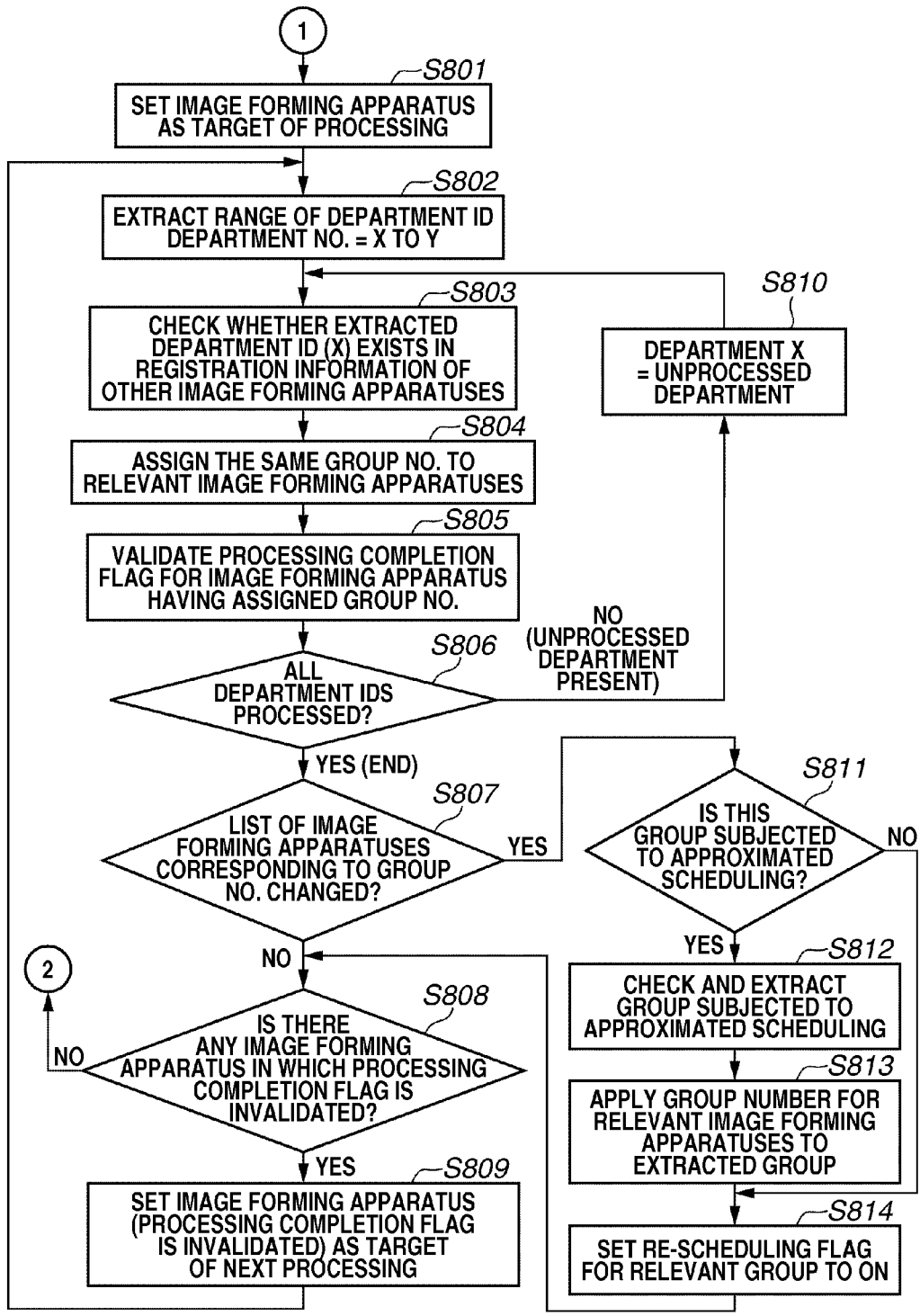
FIG. 9 is a flow chart illustrating a data processing procedure performed by the management apparatus.

In step S901, after completion of the grouping processing of FIG. 9, the management unit 405 determines whether the number of image forming apparatuses assigned to the group is less than the maximum value. This processing is performed to restrain not only the network load but also a load of processing for registering the department counter information in the management apparatus 100.

Figure 11:
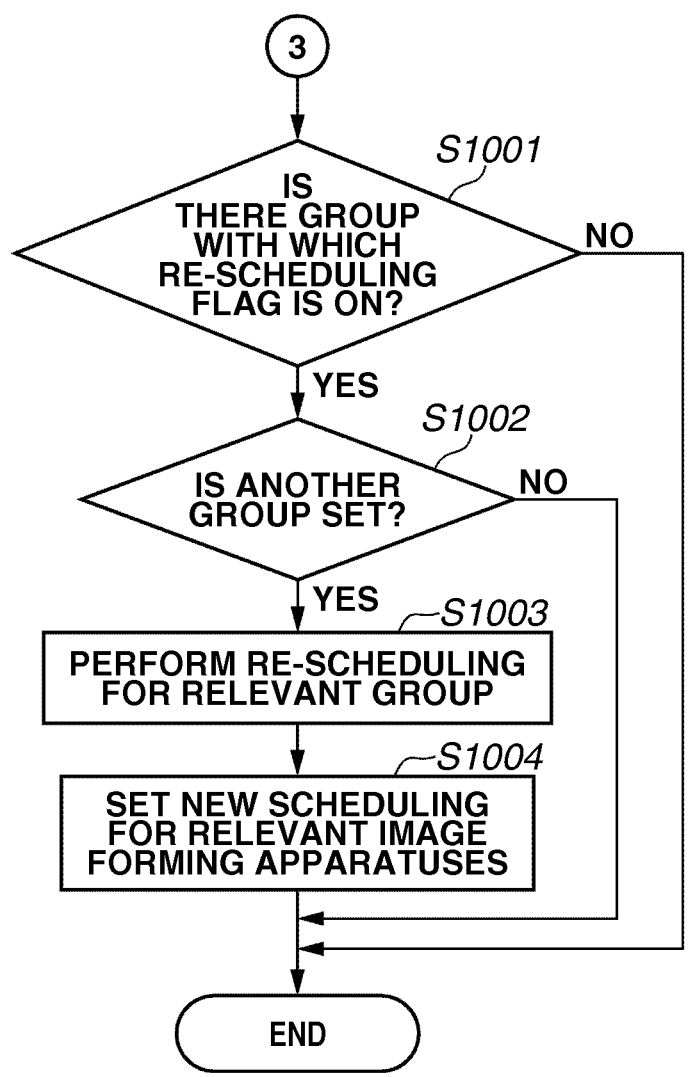
FIG. 11 is a flow chart illustrating a data processing procedure performed by the management apparatus.

When the management unit 405 determines that the number of image forming apparatuses assigned to one group is less than the maximum value (NO in step S901), the processing proceeds to the scheduling processing of FIG. 11 without performing division processing.

On the other hand, when the processing logic 403 determines that the number of image forming apparatuses assigned to one group is equal to or greater than the maximum value (YES in step S901), the processing proceeds to step S902 to assign some of the image forming apparatuses included in one group to another group.

In step S902, the management unit 405 calculates a number of divisions for the group. For example, the management unit 405 divides the number of apparatuses currently registered in the group by the maximum number of image forming apparatuses in one group. When the reminder is zero, the quotient becomes the number of divisions. Otherwise, the quotient plus one becomes the number of divisions. Then, the processing proceeds to step S903.

In step S903, the management unit 405 generates new group numbers. The number of the new group numbers is the number of divisions minus one. In step S904, the management unit 405 assigns the new group numbers generated in step S903 to each of the new groups formed after the group division.

In step S905, the management unit 405 specifies an approximated schedule setting for each of the divided groups so that a similar or close time is scheduled thereto. Then, the management unit 405 advances processing to the scheduling processing of FIG. 11.

Accordingly, the image forming apparatuses which are desirable to be managed as one group but are divided into different groups because of the maximum number setting can be prevented from being set a schedule at largely different time.

Re-scheduling processing will be described below. FIG. 11 is a flow chart illustrating an exemplary data processing procedure performed by the management apparatus according to the present exemplary embodiment. In this example, the management apparatus 100 performs processing to set a schedule to necessary image forming apparatuses based on the re-scheduling flag. Each of steps S1001 to S1004 is attained when the CPU 201 loads the modules of FIG. 4 into the RAM 202 and then executes them.

In step S1001, the management unit 405 determines whether there is any group in which the re-scheduling flag is validated. When the management unit 405 determines from a result of the grouping processing that there is no group subjected to re-scheduling (NO in step S1001), the present processing is terminated. When the management unit 405 determines that there is a group subjected to re-scheduling (YES in step S1001), the processing proceeds to step S1002.

In step S1002, the management unit 405 determines whether the present group number set for the image forming apparatuses included in the group subjected to re-scheduling is different from the former group number setting. When the management unit 405 determines that the present group number setting is the same as the former one (NO in step S1002), it is not necessary to change the schedule setting and therefore the present processing is terminated. When the management unit 405 determines that the present group number setting is different from the former one (YES in step S1002), the processing proceeds to step S1003 to perform re-scheduling for the relevant group.

The group number setting changes in the following cases:
(1) In the grouping processing, a new image forming apparatus is added to the former group and the number of apparatuses therein becomes equal to or greater than the maximum value, and the group is assigned another group number.
(2) In the grouping processing, an image forming apparatus is removed from the former group and the group is assigned a new group number.
(3) A new image forming apparatus which does not include former managed department IDs is assigned a new group number.

In step S1003, the processing logic 403 determines information for schedule setting, such as transmission time, for groups subjected to re-scheduling. After the group division processing, the processing logic 403 determines time for a plurality of groups subjected to approximated schedule setting so that the department counter information may be acquired at similar or close time, for example, at intervals of 10 through 30 minutes for each group.

Transmission intervals between groups which are set the approximated schedule (intervals of a second time period) will be much shorter than transmission intervals of normal re-scheduling (intervals of a first time period). The transmission intervals of normal re-scheduling (intervals of the first time period) will be determined in sufficient consideration of dispersion of communication load, for example, one to two hours. Transmission time of the approximated schedule setting may be determined by automatically shifting predetermined time, and transmission time of the normal re-schedule setting may be determined by an instruction from an administrator.

In step S1004, the management unit 405 transmits the information for applying a new schedule setting determined to the image forming apparatuses included in the groups subjected to re-scheduling and performs the re-scheduling. Then, the present processing in FIG. 11 is terminated. Since schedule setting is applied based on a request from the image forming apparatus as described above, a new schedule setting is reflected at that timing. Therefore, the management unit 405 manages a new schedule setting in association with the registration information of each image forming apparatus, and waits for a request from each image forming apparatus. On the other hand, the image forming apparatus analyzes the received information and then updates its own schedule setting.

FIG. 12 illustrates an exemplary user interface displayed on the display unit 207 illustrated in FIG. 2. A department summary screen is used to tally up pieces of information for each department based on the department counter information stored in the database 404 illustrated in FIG. 4.

When the user accesses a WWW server prepared by the management apparatus 100 by using a browser provided in an information processing apparatus (PC 10) on the network, the screen in FIG. 12 can be displayed on the PC 10.

Referring to FIG. 12, a summary display frame 1206 displays all image forming apparatuses which perform department management. A summary display frame 1207 displays all image forming apparatuses in which Department 1 is registered.

A department summary screen 1201 illustrated in FIG. 12 includes a summation range specifying field 1205 for specifying a range of summation, a department ID display field 1202 for displaying the department IDs of departments which have data. Further, the department summary screen 1201 includes a counter summary field 1203 for displaying the total count value of each counter in the department ID field 1202, and a transition button 1204 to be pressed to select a next page when many department IDs are displayed over a plurality of pages.

The counter summary field 1203 displays information of the department counters transmitted from a plurality of image forming apparatuses tallied over a range of summation specified in the summation range specifying field 1205. In this example, a total of nine image processing apparatuses are displayed.

With the above described re-scheduling processing, since the image forming apparatuses subjected to tally processing have almost the same schedule transmission time, an expected tally result can be obtained.

FIGS. 13 to 19 illustrate schedule settings applied to each image forming apparatus in the management apparatus according to the present exemplary embodiment.

FIG. 13 illustrates a management table after reception of first department counter information from the image forming apparatus. This exemplary management table denotes that department counter has been received from a plurality of image forming apparatuses (Dev1, Dev2, Dev3, . . . , Dev10).

In this way, a schedule setting is applied separately for each image forming apparatus at the time of initial scheduling. In this example, although a similar schedule setting can be applied to the image forming apparatuses Dev1 to Dev10 because of a same customer, doing so is not preferable since traffic may concentrate on the circuit of the same customer. Therefore, a transmission schedule setting is applied in a dispersed way.

FIG. 14 illustrates an initial schedule setting when the image forming apparatus is installed on site for the first time. A management table 1300 denotes a state, after the image forming apparatuses are installed on the site, when the department counter information is received from each image forming apparatus for the first time based on a schedule setting of each image forming apparatus.

This exemplary management table denotes that the department counter information has been transmitted from a plurality of image forming apparatuses (Dev1, Dev2, Dev3, . . . , Dev10). In this example, a column 1301 which is created for transmitted department ID denotes that the department counter information is stored for the department IDs 1 to 6, 50 to 53, 97 to 100, and 200 to 202. In the present exemplary embodiment, it is not particularly necessary for the management apparatus 100 to comprehend what kind of department counter information is transmitted first from each image forming apparatus after installation.

As shown in FIG. 14, pieces of counter information may be displayed with halftone dot meshing to make it easier to identify each acquired schedule setting. A similar schedule is set to the image forming apparatuses Dev1, Dev2, and Dev4. Another schedule is set to the image forming apparatuses Dev3 and Dev10. Further, still another schedule is set to the image forming apparatuses Dev8 and Dev9.

Processing for reflecting a result of the above described re-grouping processing to the display will be described below with reference to FIG. 15.

As the operation continues, it becomes possible to identify which image forming apparatus utilizes which department IDs to what extent based on a reception state of the department counter information illustrated in FIG. 14.

Referring to FIG. 15, the image forming apparatus Dev1 which includes the department IDs 1 to 6 is assigned to a group number G01 after grouping processing. Since the department IDs 1 to 6 are not transmitted from other image forming apparatuses, Dev1 remains in the group number G01. As illustrated in a frame 1401, the same schedule setting as that illustrated in FIG. 14 is remained for the departments 1 to 6.

On the other hand, since the image forming apparatuses Dev2, Dev3, Dev4, Dev8, Dev9, and Dev10 have common department IDs, grouping processing is performed for the image forming apparatuses in a frame 1402.

Since the image forming apparatuses Dev2 and Dev4 are assigned to a group number other than the group number G01, they are subjected to re-scheduling, and Dev2 and Dev4 are assigned to a group number G02 which is the same group number as that for other image forming apparatuses which have the common department IDs. Therefore, the same schedule setting as that for other image forming apparatuses is applied to Dev2 and Dev4. Referring to FIG. 15, since the departments 1 to 6 are used only by Dev1, Dev1 is assigned to a group different from the other image forming apparatuses.

It is assumed that the image forming apparatuses Dev1 and Dev11 utilize much more department IDs than other ones do, for example, Dev1 uses the department IDs 1 to 49 and Dev11 uses the department IDs 900 to 1000. In the present exemplary, although such a case has not been described in detail, Dev1 and Dev11 can be assigned to different groups.

Further, when each of Dev1 and Dev11 utilizes similar number of the department IDs to other image forming apparatuses, for example, Dev1 uses the department IDs 1 to 6 and Dev11 uses the department IDs 900 to 910, Dev1 and Dev11 can be assigned to the same group although they do not use the same department IDs. Thus, the number of groups can be restrained.

A case where the department counter is no longer transmitted or deleted on the side of the image forming apparatus will be described below with reference to FIGS. 14 to 18. In this case, the initial operation state is as illustrated in FIG. 13. Then, the above described grouping processing and re-scheduling processing are performed in states illustrated in FIGS. 14 and 15.

However, as the operation state changes, the counter value of a certain department ID does not increase or a department ID is deleted on the side of the image forming apparatus and the relevant information is no longer transmitted.

Referring to FIG. 16, with the image forming apparatuses Dev3 and Dev4, counters of some department IDs do not increase or satisfy the increase condition. More specifically, the department counters of department IDs 200, 201, and 202 of the image forming apparatus Dev3 and department IDs 97, 98, 99, and 100 of the image forming apparatus Dev4 do not increase.

Therefore, the former grouping will be reviewed. In this case, the departments 200 to 202 of Dev3 and the departments 97 to 100 of Dev4 will be removed from the department IDs subjected to determination in grouping processing.

The image forming apparatuses Dev2, Dev3, Dev4, Dev8, Dev9, and Dev10 are included in the group denoted by the former group number 02. Referring to FIG. 16, according to subsequent operation state, the image forming apparatuses Dev2 and Dev4 are grouped as the group number 02. Then, the remaining image forming apparatuses Dev3, Dev8, Dev9, and Dev10 are grouped as a new group denoted by a group number G03, and a new schedule setting 1502 is applied.

Although description has been made of a case where the department counter information does not increase with reference to FIG. 16, similar processing will be performed also when the department ID itself is deleted.

FIG. 17 illustrates a state in which the department counters of the department IDs 97 to 100 of the image forming apparatus Dev4 are deleted, as shown in a frame 1601, after a schedule setting illustrated in FIG. 15.

In this case, similarly to FIG. 16, the image forming apparatuses Dev2 and Dev4 are grouped in the same group denoted by the group number G02. Then, the image forming apparatuses Dev3, Dev8, Dev9, and Dev10 are grouped in another group (the group number G03). As illustrated in FIG. 18, a schedule setting 1701 is applied to the image forming apparatuses belonging to the group denoted by the group number G03.

FIG. 19 illustrates a state in which a new image forming apparatus (Dev11) is registered as illustrated in a frame 1801. Processing for determining whether re-scheduling processing is necessary will be described below.

In the processing, each department ID utilized by the newly registered image forming apparatus Dev11 is checked whether it overlaps with any department ID registered and utilized by other image forming apparatuses in former grouping. When each department ID utilized by the new image forming apparatus Dev11 does not overlap with any department ID for other image forming apparatuses, it is possible to generate a new group to register the new image forming apparatus Dev11 and set a schedule. Alternatively, it is also possible to register the new image forming apparatus Dev11 in an existing group to which a very small number of apparatuses belong. On the other hand, when each department ID utilized by the new image forming apparatus Dev11 overlaps with any department ID for other image forming apparatuses, it is necessary to determine which image forming apparatus's schedule setting to be applied to the image forming apparatus Dev11. In this case, grouping is performed in consideration of the maximum number of image forming apparatuses per group as described above, and a schedule setting is suitably applied to each group.

Referring to FIG. 19, the new image forming apparatus Dev11 is registered in the group denoted by the former group number G02, and a schedule is set to Dev11.

The present invention can also be realized by executing the following process. That is, a process in which a software (program) that realizes the functions of the above-described embodiments is supplied to the system or apparatus via a network or a recording medium of various types, and then a computer of the system or apparatus (or devices such as CPU or MPU) reads out the program and executes it. In such a case, the recording medium where the program is stored as well as the program are included in the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-063141 filed Mar. 16, 2009, which is hereby incorporated by reference herein in its entirety.

What is claimed is:

1. A management apparatus which manages department counter information received from a plurality of image forming apparatuses based on a transmission schedule set to each image forming apparatus using a database, the management apparatus comprising:
   a registration unit configured to associate (1) identification information of one of the plurality of image forming apparatuses, (2) a department ID received from the one of the plurality of image forming apparatuses, and (3) the department counter information corresponding to the department ID, wherein the registration unit registers (1)-(3) as information in the database;
   an identification unit configured to identify a plurality of image forming apparatuses which include overlapping department ID;
   a management unit configured to manage, when the plurality of image forming apparatuses identified by the identification unit is less than a predetermined maximum value, the plurality of image forming apparatuses identified by the identification unit in a group;
   a determination unit configured to determine a transmission schedule for each of a plurality of groups managed by the management unit so that the department counter information is transmitted from the plurality of image forming apparatuses belonging to each of the plurality of groups at intervals of at least a first time period; and
   a transmission unit configured to generate information for setting the transmission schedule for each of the plurality of groups determined by the determination unit to the image forming apparatuses belonging to each of the plurality of groups, and transmit the generated information to the image forming apparatuses belonging to each of the plurality of groups in response to a request therefrom,
   wherein, when the plurality of image forming apparatuses identified by the identification unit is equal to greater than the predetermined maximum value, the management unit manages the plurality of image forming apparatuses identified by the identification unit in a plurality of different groups, and
   wherein, when the plurality of image forming apparatuses identified by the identification unit are managed in the plurality of different groups by the management unit, the determination unit determines the transmission schedule for each of the plurality of groups such that transmission is performed at intervals of a second time period which is shorter than the first time period.

2. The management apparatus according to claim 1, wherein, when department counter information received from the one of the plurality of image forming apparatuses is less than a predetermined value based on the information registered in the database, the department ID corresponding to the department counter information is regarded as being unused by the one of the plurality of image forming apparatuses, and
   wherein the identification unit identifies the plurality of image forming apparatuses which include overlapping department ID after excluding the department ID which is regarded as being unused by the one of the plurality of image forming apparatuses.

3. The management apparatus according to claim 1, wherein, when the plurality of image forming apparatuses identified by the identification unit are managed in the plurality of different groups by the management unit, the management unit performs management so that each of the plurality of different groups can be identified when the plurality of different groups managed by the management unit are reviewed.

4. A method for causing a management apparatus to manage department counter information received from a plurality of image forming apparatuses based on a transmission schedule set to each of the plurality of image forming apparatuses using a database, the method comprising:
   associating (1) identification information of one of the plurality of image forming apparatuses, (2) a department ID received from the one of the plurality of image forming apparatuses, and (3) the department counter information corresponding to the department ID;
   registering (1)-(3) as information in the database;
   identifying a plurality of image forming apparatuses which include overlapping department ID;
   managing, when the plurality of identified image forming apparatuses identified in the identifying step is less than a predetermined maximum value, the plurality of image forming apparatuses identified in the identifying step in a group;
   determining a transmission schedule for each of a plurality of groups managed in the managing step so that the department counter information is transmitted from the plurality of image forming apparatuses belonging to each of the plurality of groups at intervals of at least a first time period; and
   generating information for setting the transmission schedule for each of the plurality of groups determined in the determining step to the image forming apparatuses belonging to each of the plurality of groups, and transmitting the generated information to the image forming apparatuses belonging to each of the plurality of groups in response to a request therefrom,
   wherein, when the plurality of image forming apparatuses identified in the identifying step is equal to greater than the predetermined maximum value, the managing step manages the plurality of image forming apparatuses identified in the identifying step in a plurality of different groups, and
   wherein, when the plurality of image forming apparatuses identified in the identifying step are managed in the plurality of different groups by the managing step, the determining step determines the transmission schedule for each of the plurality of groups such that transmission is performed at intervals of a second time period which is shorter than the first time period.

5. The method according to claim 4, wherein,
   when department counter information received from the one of the plurality of image forming apparatuses is less than a predetermined value based on the information registered in the database, the department ID corresponding to the department counter information is regarded as being unused by the one of the plurality of image forming apparatuses, and
   the identifying step identifies the plurality of image forming apparatuses which include overlapping department ID after excluding the department ID which is regarded as being unused by the one of the plurality of image forming apparatuses.

6. The method according to claim 4, wherein,
   when the plurality of image forming apparatuses identified in the identifying step are managed in the plurality of different groups in the managing step, the managing step performs management so that each of the plurality of different groups can be identified when the plurality of different groups managed in the managing step are reviewed.

7. A non-transitory computer readable storage medium storing computer executable instructions for causing a computer to execute a method for managing department counter information received from a plurality of image forming apparatuses based on a transmission schedule set to each of the plurality of image forming apparatuses using a database, the instructions comprising:
  instructions for associating (1) identification information of one of the plurality of image forming apparatuses, (2) a department ID received from the one of the plurality of image forming apparatuses, and (3) the department counter information corresponding to the department ID;
  instructions for registering (1)-(3) as information in the database;
  instructions for identifying a plurality of image forming apparatuses which include overlapping department ID;
  instructions for managing, when the plurality of identified image forming apparatuses identified in the identifying step is less than a predetermined maximum value, the plurality of image forming apparatuses identified in the identifying step in a group;
  instructions for determining a transmission schedule for each of a plurality of groups managed in the managing step so that the department counter information is transmitted from the image forming apparatuses belonging to each of the plurality of groups at intervals of at least a first time period; and
  instructions for generating information for setting the determined transmission schedule for each of the plurality of groups determined in the determining step to the image forming apparatuses belonging to each of the plurality of groups, and transmitting the generated information to the image forming apparatuses belonging to each of the plurality of groups in response to a request therefrom,
  wherein, when the plurality of identified image forming apparatuses identified in the identifying step is equal to greater than the predetermined maximum value, the managing step manages the plurality of image forming apparatuses identified in the identifying step in a plurality of different groups, and
  wherein, when the plurality of image forming apparatuses identified in the identifying step are managed in the plurality of different groups by the managing step, the determining step determines the transmission schedule for each of the plurality of groups such that transmission is performed at intervals of a second time period which is shorter than the first time period.

* * * * *